(12) United States Patent
Takeshita et al.

(10) Patent No.: US 6,749,960 B2
(45) Date of Patent: *Jun. 15, 2004

(54) BATTERY PACK, BATTERY LOADING DEVICE, POWER SUPPLYING DEVICE AND ELECTRONIC EQUIPMENT

(75) Inventors: Toshio Takeshita, Kanagawa (JP); Masaki Hanzawa, Chiba (JP)

(73) Assignee: Sony Corporation (JP)

( * ) Notice: Subject to any disclaimer, the term of this patent is extended or adjusted under 35 U.S.C. 154(b) by 211 days.

This patent is subject to a terminal disclaimer.

(21) Appl. No.: 09/994,315

(22) Filed: Nov. 26, 2001

(65) Prior Publication Data

US 2002/0034683 A1 Mar. 21, 2002

Related U.S. Application Data

(62) Division of application No. 09/505,912, filed on Feb. 17, 2000, now Pat. No. 6,311,913.

(30) Foreign Application Priority Data

Feb. 17, 1999 (JP) .......................................... P11-039290

(51) Int. Cl.[7] .......................... H01M 10/38; H01M 2/10
(52) U.S. Cl. .......................... 429/123; 429/97; 429/100
(58) Field of Search .......................... 429/96, 97, 100, 429/123

(56) References Cited

U.S. PATENT DOCUMENTS

| | | | |
|---|---|---|---|
| 4,810,204 A | 3/1989 | Wilson | 439/343 |
| 5,602,454 A | 2/1997 | Arakawa et al. | |
| 5,672,441 A * | 9/1997 | Aoki et al. | 429/97 |
| 6,521,370 B1 * | 2/2003 | Takeshita et al. | 429/96 |

* cited by examiner

Primary Examiner—Patrick Ryan
Assistant Examiner—Julian Mercado
(74) Attorney, Agent, or Firm—Lerner, David, Littenberg, Krumholz & Mentlik, LLP

(57) ABSTRACT

A battery pack includes structures which prevent it from being improperly loaded in a battery loading device. The battery pack includes a battery cell, a casing for housing the battery cell, and output terminals for outputting the power of the battery cell. The bottom surface of the battery pack includes a discriminating recess formed in the bottom surface and control recesses formed at the intersection of its bottom and front surfaces. These recesses are sized and shaped to accept corresponding projections on selected battery loading devices so that the battery pack may be loaded onto these battery loading devices. However, the recesses do not accept the corresponding projections on other battery loading devices, thereby preventing the battery packs from being assembled to these other battery loading devices.

5 Claims, 23 Drawing Sheets

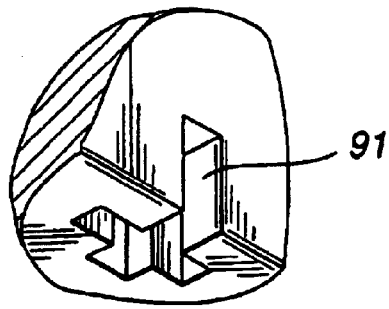
FIG.16A
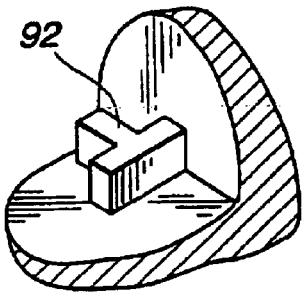   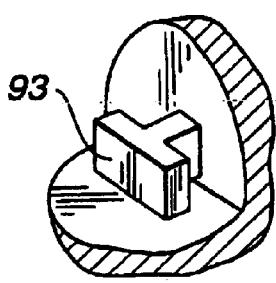   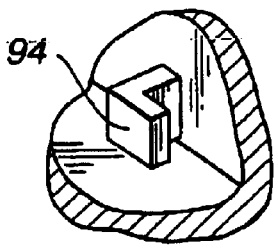
FIG.16B      FIG.16C      FIG.16D
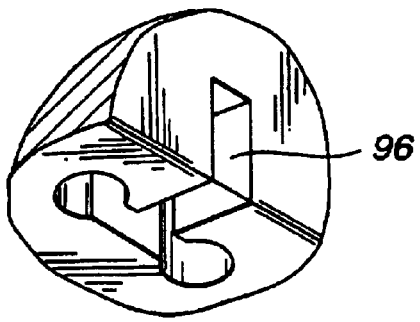
FIG.17A
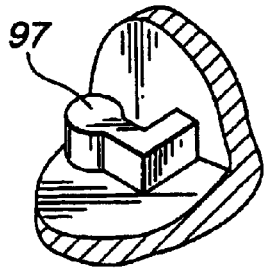   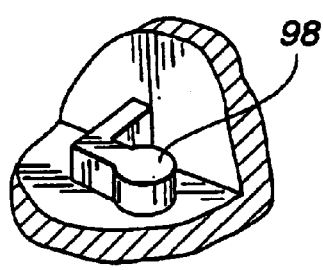
FIG.17B   FIG.17C

BATTERY PACK, BATTERY LOADING DEVICE, POWER SUPPLYING DEVICE AND ELECTRONIC EQUIPMENT

CROSS REFERENCE TO RELATED APPLICATIONS

This application is a divisional of application Ser. No. 09/505,912 filed Feb. 17, 2000 now U.S. Pat. No. 6,311,913, the disclosure of which is hereby incorporated by reference herein.

BACKGROUND OF THE INVENTION

This invention relates to a battery pack, having housed therein a charging type battery cell used e.g., as a power source of an electronic equipment, a battery device on which is loaded the battery pack etc., and to an external equipment having the battery device on which is loaded the battery pack etc. This invention also relates to a power supplying device for outputting the power furnished from e.g., an external power source.

There has hitherto been known a battery pack having therein a battery cell used as a power source for an electronic equipment. This sort of the battery pack is detachably loaded on a battery loading device provided on the main body portion of the electronic equipment.

The battery pack is made up of a battery cell for supplying the power, a casing having this battery cell housed therein, and an output terminal connected to a connection terminal in the battery loading device. The battery cell provided in the battery pack is chargeable, such that, in power depletion, it is charged through the output terminal. The battery casing has guide grooves on both lateral sides thereof engaging with the battery loading device. The output terminal is arranged adjacent to the bottom surface of the casing so that its one end faces a longitudinal lateral side thereof.

The battery loading device includes a loading section for loading the battery pack and a terminal for connection to the output terminal of the battery pack. The loading section is formed with a setting surface slightly larger in area than the outer size of the battery pack and on which the bottom surface of the battery pack is set. On the surfaces of the loading section facing both lateral sides of the battery pack are formed guide projections engaged in the guide grooves formed in the battery pack.

The terminal section is arranged on the inner rim of the loading section for facing the output terminal of the loaded battery pack. On loading the battery pack on the loading section, the terminal section is connected to the output terminal of the battery pack to permit the power to be supplied.

With the above-described structure of the battery loading device, the operation of loading the battery pack on the loading section of the battery loading device is hereinafter explained. When loading the battery pack on the loading section of the battery loading device, the respective guide projections on the loading section are engaged in the respective guide recesses with the bottom surface of the battery pack substantially parallel to the setting surface of the loading section. When loaded on the battery loading device, the battery pack furnishes the power from the battery cell to an electronic equipment provided with the battery loading device through the output terminal connected to the terminal section in the loading section.

When a battery pack is loaded on the battery loading device, the battery pack occasionally is introduced and loaded with its bottom surface tilted relative to a setting surface of a loading section of the battery loading device.

When the battery pack is loaded on the loading section of the battery loading device, the bottom surface of the battery pack may be loaded with the bottom surface of the battery pack being tilted relative to the setting surface of the loading section of the battery loading device in the lengthwise direction of the battery pack or with the bottom surface of the battery pack being tilted relative to the setting surface of the loading section of the battery loading device in the width-wise direction. The former and latter cases are referred to below as the battery pack being loaded with a tilt in the longitudinal direction and as the battery pack being loaded with a tilt in the width-wise direction, respectively.

If a battery pack 401 is loaded with a tilt in the longitudinal direction relative to the loading section, by having one end in the inserting direction of the battery pack into the loading section of a battery loading device 402 proximate to the setting surface of the loading section, as shown in FIG. 1, mistaken loading is restricted by a guide recess 405 formed on both width-wise sides and by a guide projection 411 of the battery loading device 402.

However, if the battery pack 401 is inserted with its bottom surface tilted in the width-wise direction relative to the setting surface of the battery loading device 402 and thrust with a larger force, a guide groove 409 may ride over the guide projection 413 formed on the loading section in an imperfect loading of the battery pack on the loading section.

If the battery pack 401 is inserted with a tilt relative to the setting surface and loaded in a non-optimum position on the loading section, there is a risk of the battery pack 401 inadvertently descending from the loading section to destroy the battery pack 401.

That is, if, with the conventional battery loading device, the battery pack 401 is erroneously loaded with a width-wise tilt on the setting surface of the battery loading device 402, there is no restricting means for positively prohibiting the battery pack 401 from being loaded with a tilt in the width-wise direction, thus possibly leading to loading of the battery pack with a tilt in the width-wise direction.

SUMMARY OF THE INVENTION

It is therefore an object of the present invention to provide a battery pack which is positively prohibited from being loaded with a tilt on the loading section of the battery loading device to protect the output terminal and the connection terminal against possible destruction, and a battery loading device on which is loaded a power supply member exemplified by the battery pack.

It is another object of the present invention to provide an electronic equipment in which a power supply member is positively prohibited from being loaded with a tilt to protect the output terminal and the connection terminal against possible destruction.

It is yet another object of the present invention to provide a power supply device which is positively prohibited from being loaded with a tilt on the battery loading device to prevent destruction of the output terminal and the connection terminal.

In view of the above objects, the present invention provides a battery pack having plural engagement recesses at corners of first and second surfaces of the casing for opening in the first and second surfaces. At least one of the engagement recesses has a bent form such that an opening thereof in the first surface has a portion perpendicular to the second surface and a portion parallel to the second surface.

When loading the battery pack on the battery loading device, the plural engagement recesses of the casing are engaged by projections of the battery loading device, whereby the second surface of the casing is correctly oriented relative to the battery loading device.

A battery loading device according to the present invention includes plural engagement recesses at corners of first and second surfaces of the casing for opening in the first and second surfaces so as to be engaged by the battery loading device. At least one of the engagement recesses has a bent form such that an opening thereof in the first surface has a portion perpendicular to the second surface and a portion parallel to the second surface.

When loading the power supply device on the battery loading device, the plural engagement recesses of the casing are engaged by plural projections of the battery loading device so that the second surface of the casing is correctly oriented relative to the battery loading device.

An electronic equipment according to the present invention includes a plurality of projections provided substantially on a centerline of the second surface perpendicular to said first surface, and a plurality of engagement projections formed at corners of said first and second surfaces for engaging with the power supplying member. At least one of the engagement projections has a bent shape as cast on the first surface. The bent shape is made up of a portion perpendicular to the second surface and a portion parallel to the second surface.

With the electronic equipment, when a power supplying member is loaded on the battery loading device, the engagement projections are engaged with the power supplying member, whereby the power supplying member is oriented correctly relative to the battery loading device.

The battery pack of the present invention can be positively prevented from being erroneously loaded on the inappropriate battery loading device.

With the battery loading device of the present invention, a power supply member inappropriate for the device can be positively prohibited from being erroneously loaded thereon.

The power supply device of the present invention can be positively prohibited from being erroneously loaded on a battery loading device inappropriate for the power supply device.

Also, with the electronic equipment of the present invention, a power supply member inappropriate for the equipment can be positively prohibited from being erroneously loaded thereon.

BRIEF DESCRIPTION OF THE DRAWINGS

FIGS. 16A to 16D are perspective views showing another modified discrimination recess and other modified discrimination projections.

FIGS. 17A to 17C are perspective views showing still another modified discrimination recess and still other modified discrimination projections.

DETAILED DESCRIPTION

Figure 1:
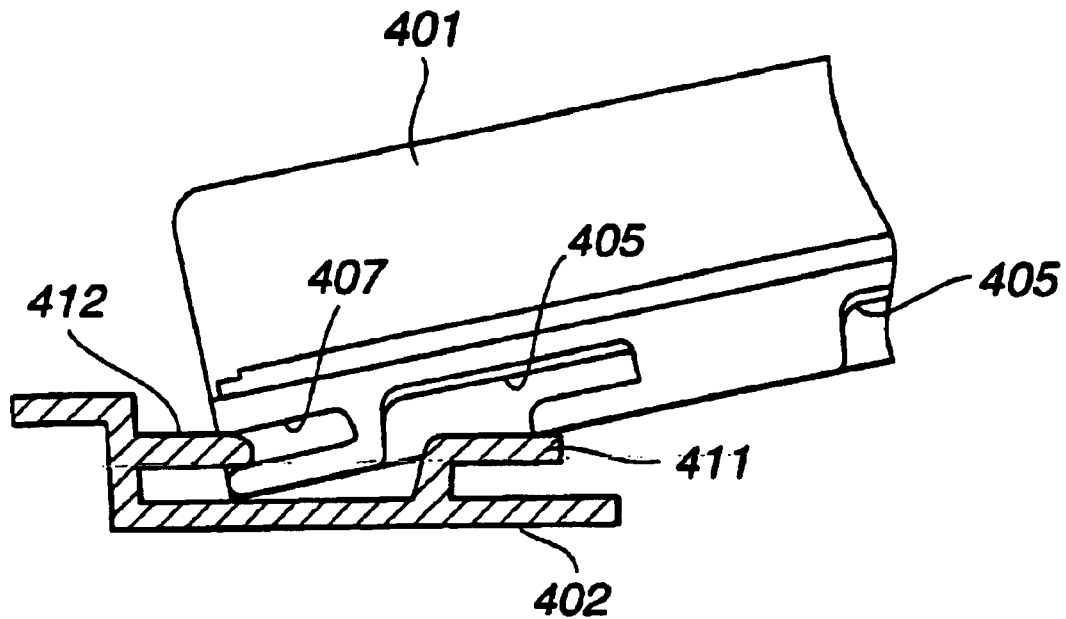
FIG. 1 is a side view showing the state in which a conventional battery pack is loaded on a conventional battery loading device with a tilt in the longitudinal direction.
Figure 2:
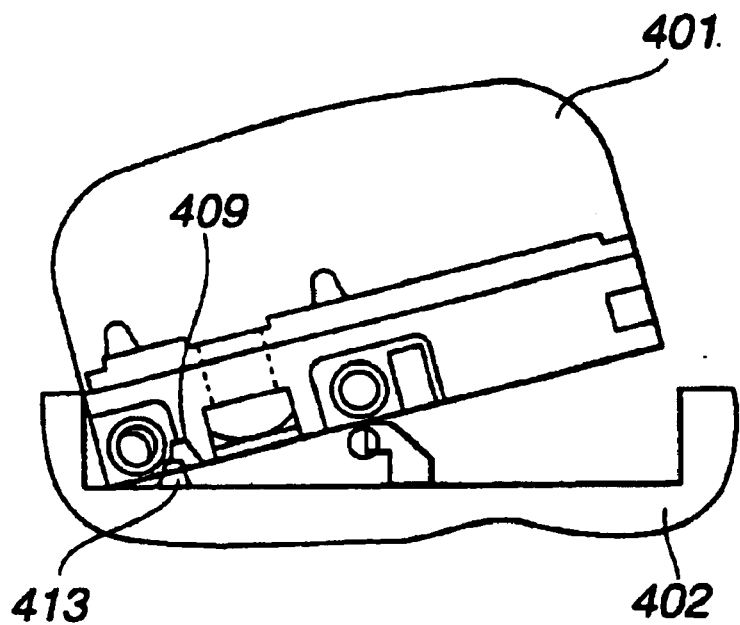
FIG. 2 is a side view showing the state in which a conventional battery pack is loaded on a conventional battery loading device with a tilt in the width-wise direction.
Figure 3:
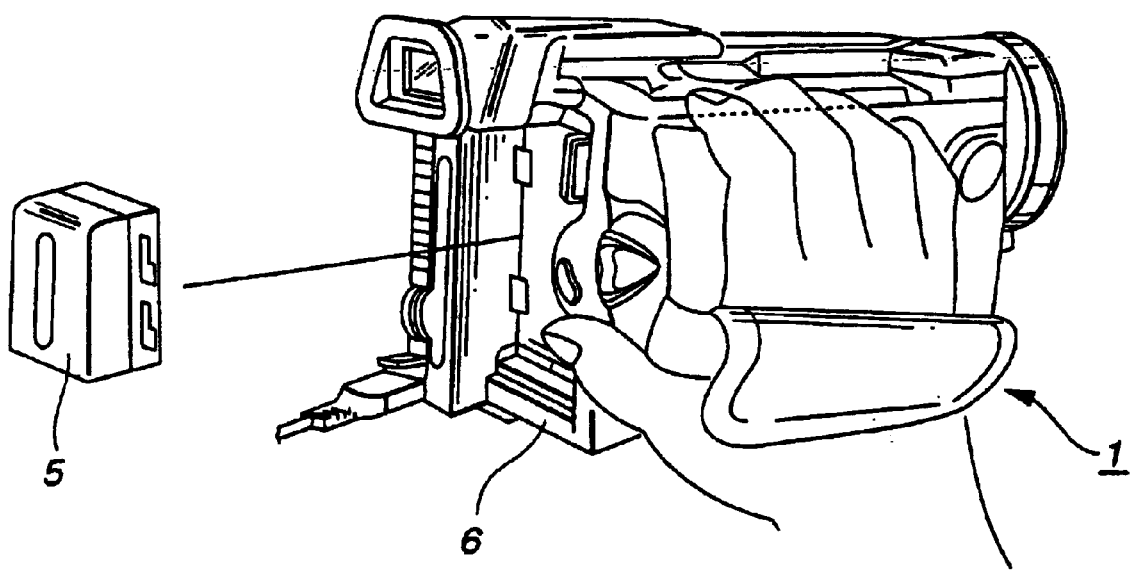
FIG. 3 is a perspective view showing a video camera apparatus having a battery loading mechanism according to the present invention.

Referring to the drawings, a battery pack and a battery loading device having a battery loading mechanism for loading the battery pack according to the present invention will be explained in detail. It is noted that a battery pack 5 and a battery loading device 6, provided on the battery loading mechanism, are applied to a video camera apparatus 1, as shown for example in FIG. 3.

The battery pack 5 may be of a high capacity type, a standard capacity type or of a low capacity type, depending on the size of the charging capacity of the battery cell. The battery pack 5 may also be of the plate type adapted to be supplied with the power from an external power source. There are different battery loading devices associated with these different sorts of battery packs.

Figure 4:
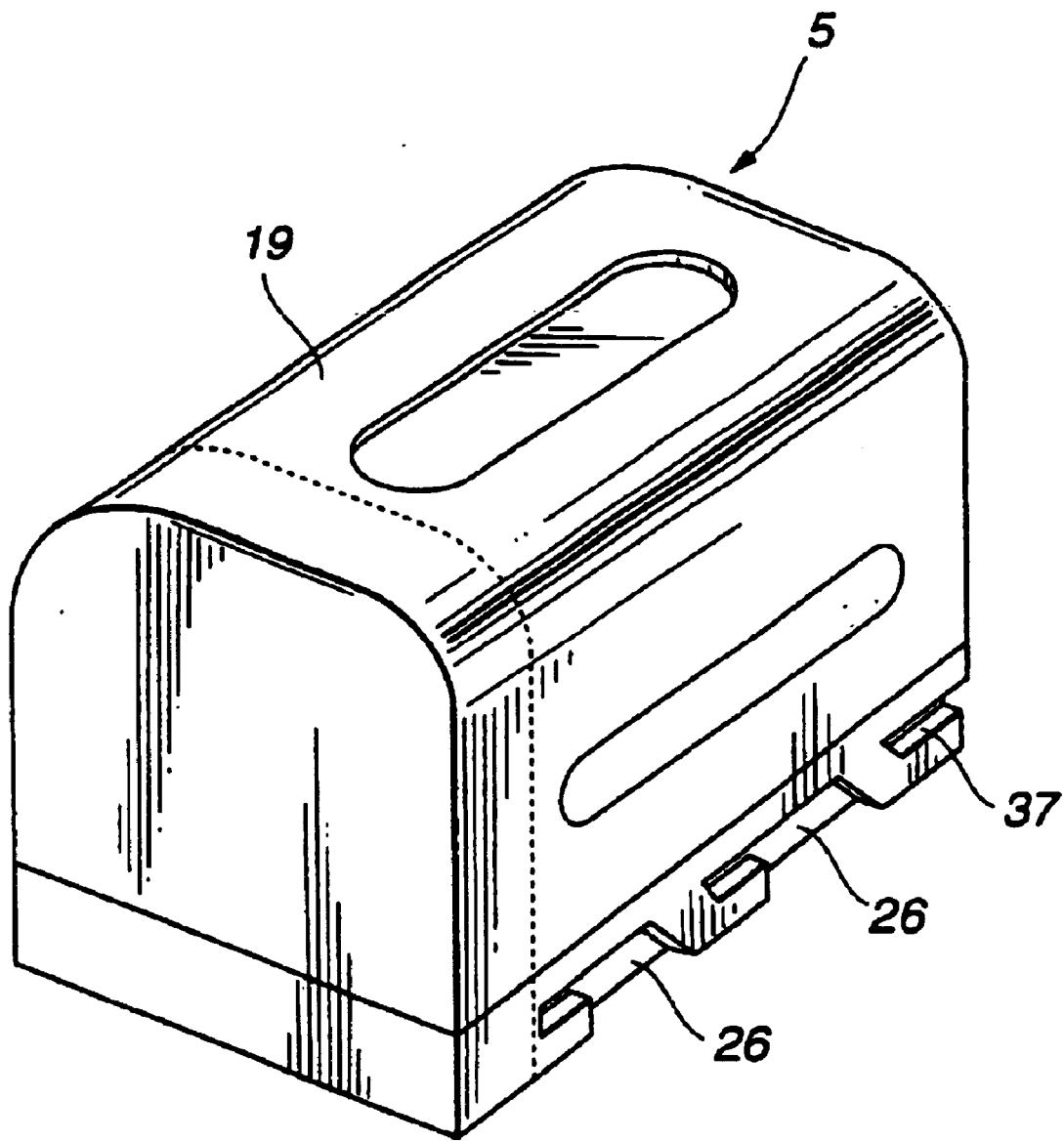
FIG. 4 is a perspective view showing a first battery pack provided on the battery loading mechanism.
Figure 5:
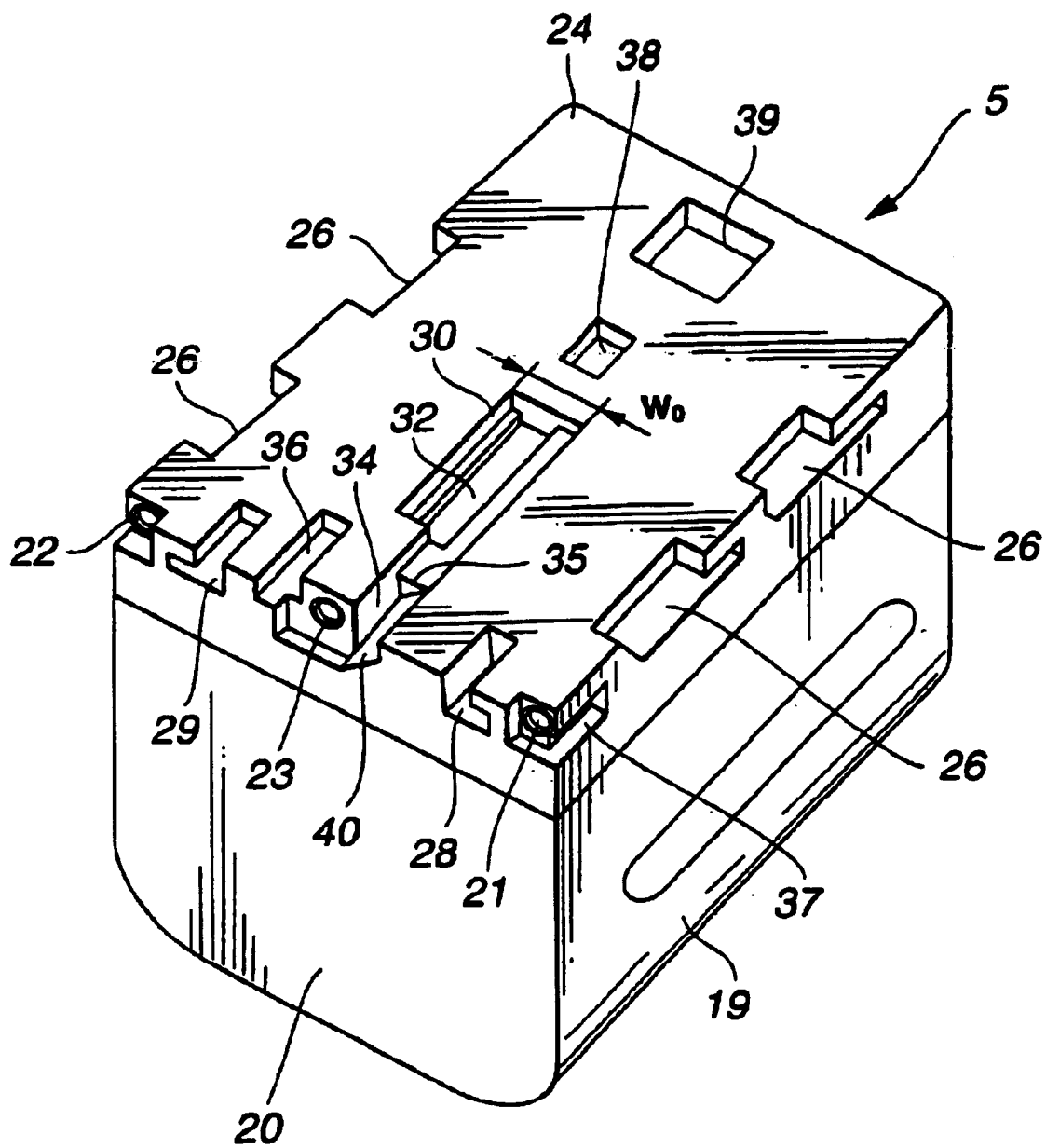
FIG. 5 is a perspective view looking from the bottom side of the first battery pack.

Referring first to FIGS. 4 and 5, the first battery pack 5, used as a high capacity type, includes a battery cell, not shown, a casing 19, housing therein the battery cell, and plural output terminals 21 to 23 connected to the battery cell.

The first battery pack 5 includes a casing 19 formed of, for example, a synthetic resin material. Referring to FIGS. 4 and 5, the casing 19 has guide grooves 26, 26 on both its width-wise lateral sides for guiding the casing as to the loading direction to a first battery loading device 6. The guide grooves 26, 26 on both lateral sides of the casing 19 are opened at one end thereof on the bottom surface 24 of the casing 19 and are arrayed side-by-side in the longitudinal direction of the casing 19, as shown in FIG. 5.

On a front surface 20 of the casing 19 in the loading direction to the first battery loading device 6, there are provided a first output terminal 21 and a second output terminal 22 on both width-wise lateral sides of the casing 19. At a width-wise mid portion of the front surface of the casing 19, there is provided a third output terminal 23. The first and second output terminals 21, 22 furnish the power through the battery loading device 6 to a main body portion of the video camera apparatus 1. The third output terminal 23 outputs information signals, such as residual power of the battery cell, to the main body portion of the video camera apparatus 1. The outwardly directed ends of the output terminals 21 to 23 are positioned in substantially rectangular recesses formed in the front surface 20 of the casing 19. Thus, these ends of the output terminals are prohibited from being destroyed due to abutment against portions other than the connection terminals of the battery loading device.

The casing 19 of the first battery pack 5 is provided with a pair of control recesses 28, 29, as shown in FIG. 5, for regulating the tilt in the width-wise direction of the bottom surface 24 of the casing 19 with respect to the first battery loading device 6 when the casing 19 is loaded on the appropriate first battery loading device 6. These control recesses 28, 29 are formed line-symmetrically in the front surface 20 with respect to a width-wise mid line, not shown, in the inserting direction into the first battery loading device 6.

These control recesses 28, 29 are each provided with a first portion extending at right angles to the bottom surface 24 of the casing 19 and a second portion extending at right angles to the first portion, and hence are substantially L-shaped in cross-section, as shown in FIG. 5.

The first battery pack 5 also includes, at a mid portion in the bottom surface 24 of the casing 19, a substantially rectangular discrimination recess 30 for discriminating whether or not the battery loading device is an appropriate battery loading device for battery pack 5.

The discrimination recess 30, thus located substantially on the width-wise centerline of the casing 19, is formed from the mid position of the bottom surface 24 of the casing 19 towards the front surface 20, as shown in FIG. 5. In the bottom surface in the discrimination recess 30, a substantially rectangular discrimination groove 32 is formed on substantially the width-wise centerline of the casing 19 between the longitudinal ends of the discrimination recess 30, as shown in FIG. 5. Thus, the inside of the discrimination recess 30 is formed with steps on both width-wise sides thereof, as shown in FIG. 5. This discrimination recess 30 has a size $W_0$ in a direction parallel to the width of the bottom surface 24.

The first battery pack 5 also includes a first guide groove 34, adjacent to the third output terminal 23, as shown in FIG. 5. The first guide groove 34 is formed parallel to the longitudinal direction of the casing 19 for guiding the loading direction to the first battery pack 5. This first guide groove 34 has its one end opened in the front surface 20 of the casing 19, while having its other end extended in continuation to the discrimination recess 30. Adjacent to the front surface 20 of the casing 19, there is formed in the first guide groove 34 a step 35 having a different depth, that is a different size in the direction perpendicular to the bottom surface 24 of the casing 19.

In the bottom surface 24 of the casing 19, there is formed a second guide groove 36, at an opposite side of the third output terminal 23 with respect to the first guide groove 34, as shown in FIG. 5. This second guide groove 36 is formed parallel to the longitudinal direction of the casing 19 and has its one end opened in the front surface 20 of the casing 19.

In both width-wise lateral sides of the casing 19, there are formed control grooves 37, 37, adjacent to the first and second output terminals 21, 22, so as to be opened in the front surface 20 substantially parallel to the bottom surface 24. These control grooves 37, 37 serve for regulating the tilt in the width-wise direction of the bottom surface 24 with respect to the first battery loading device 6.

In the bottom surface 24 of the casing 19, there are formed a first lock recess 38 and a second lock recess 39 engaged by the first battery loading device 6 when the casing is loaded on the first battery loading device 6. The first lock recess 38 is substantially rectangular in profile and is located substantially on the width-wise centerline of the casing 19 adjacent to the discrimination recess 30. The second lock recess 39, slightly larger in size than the first lock recess 38, is substantially rectangular in profile and is formed in the back side in the loading direction on substantially the width-wise centerline of the casing 19.

Figure 6:
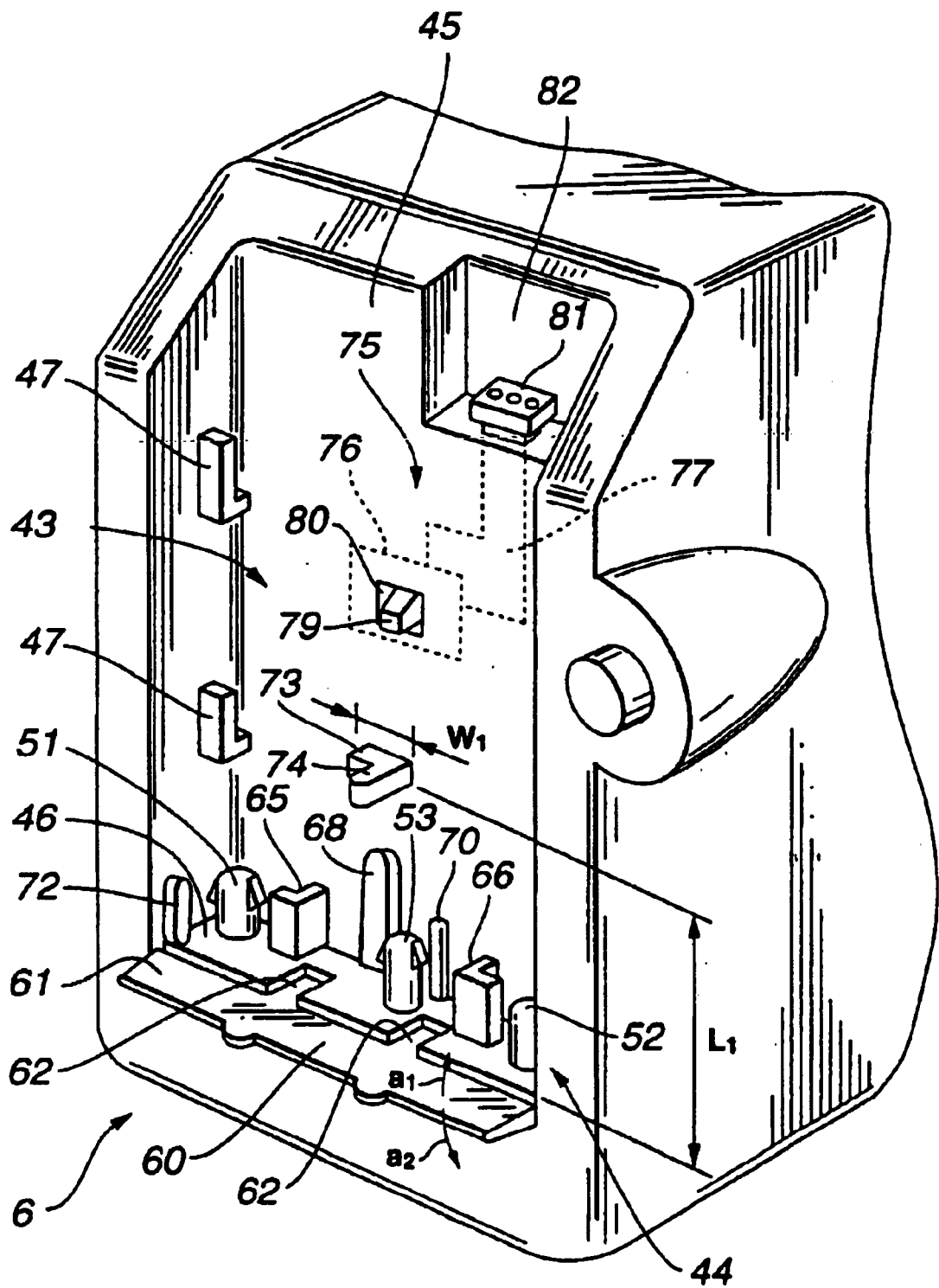
FIG. 6 is a perspective view showing a first battery loading device provided on the battery loading mechanism.

As shown in FIG. 6, the first battery loading device 6 includes a loading section 43 having a setting surface 45 on which to set the bottom surface 24 of the battery pack 5, and a terminal section 44 to which are connected the respective output terminals 21 to 23 of the first battery pack 5. The loading section 43 is slightly larger in size than the bottom surface 24 of the first battery pack 5, and is formed with guide projections 47, 47 engageable with the guide grooves 26, 26 of the first battery pack 5. The guide projections 47 are formed on the inner lateral sides in the width-wise direction of the battery loading device 6 adjacent to the setting surface 45.

When the first battery pack is loaded in position, the loading section 43 sets the bottom surface 24 of the casing 19 parallel to the setting surface 45, by the guide projections 47, 47 engaging in the guide grooves 26, 26 of the casing 19, as the loading section 43 holds the first battery pack 5.

Figure 7:
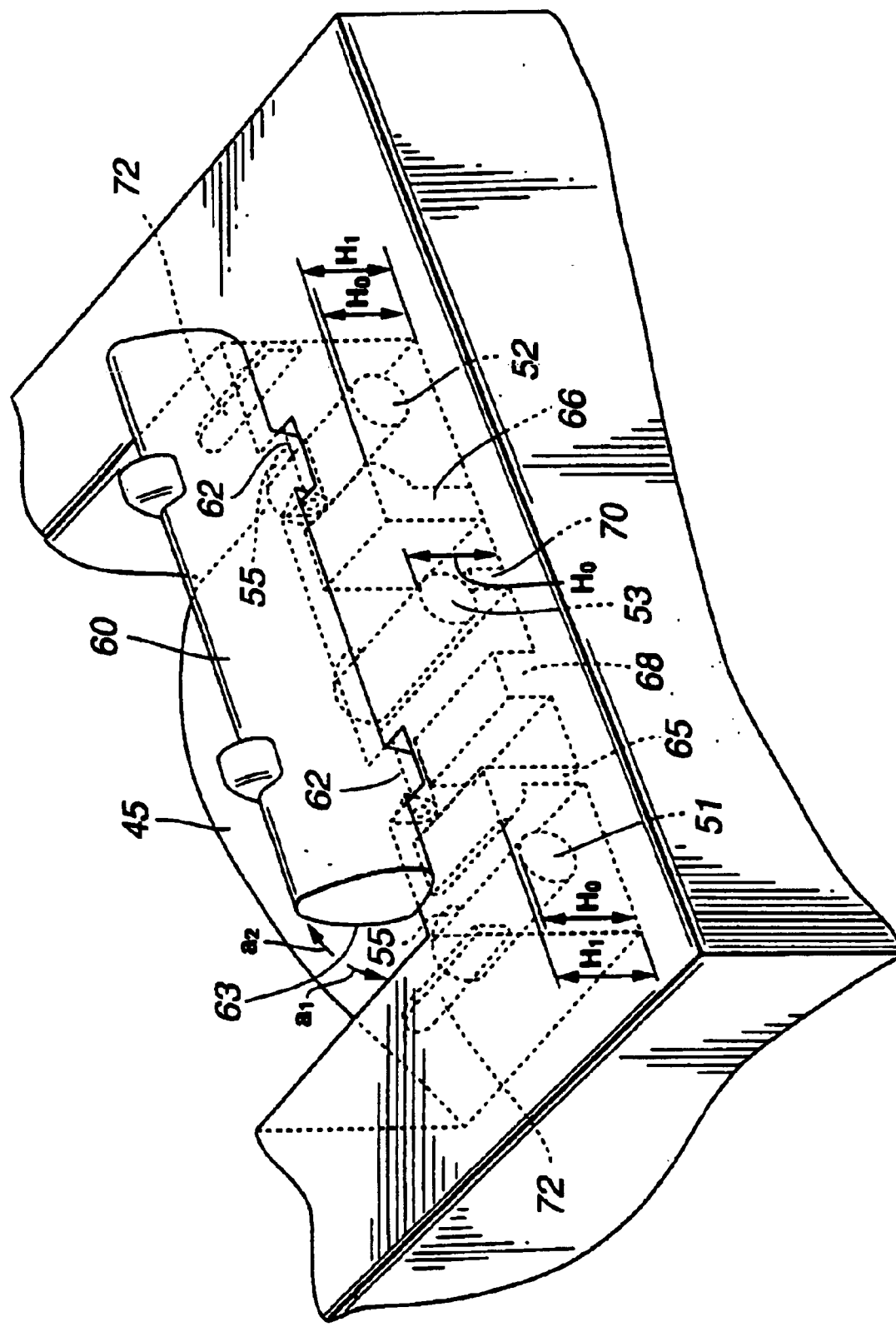
FIG. 7 is a perspective view showing a terminal section provided on the battery loading mechanism.
Figure 8:
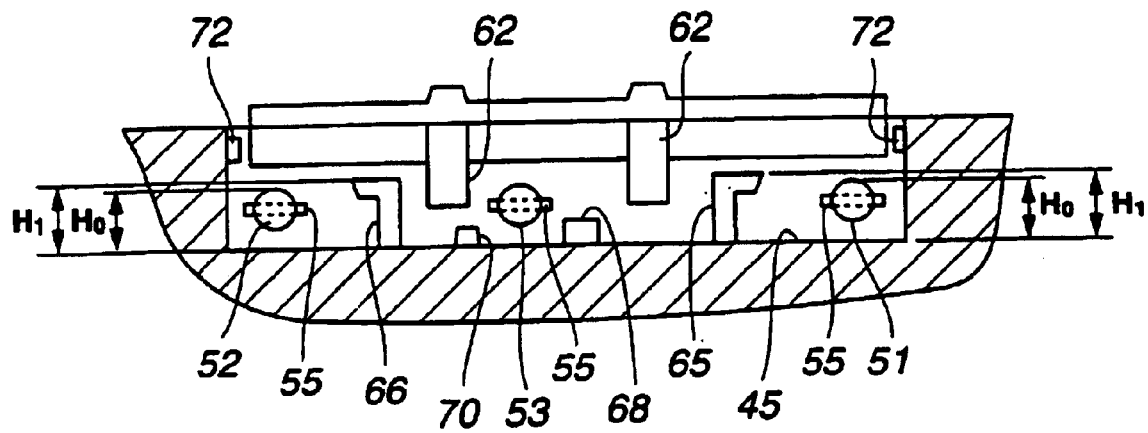
FIG. 8 is a front view showing the terminal section.

The terminal section 44 is arranged on an abutment surface 46 facing the front surface 20 of the loaded first battery pack 5, as shown in FIGS. 6 and 7. With the terminal section 44, a first connection terminal 51 and a second connection terminal 52, connectable respectively to the first and second output terminals 21, 22 of the first battery pack 5, are provided on both sides along the width-wise direction of the loading section 43, as shown in FIGS. 6 and 8. Also, with the terminal section 44, a third connection terminal 53, connectable to the third output terminal 23 of the first battery pack 5, is located at a mid portion along the width-wise direction of the loading section 43.

The first to third connection terminals 51 to 53 are formed on the abutment surface 46 parallel to the bottom surface 24 of the first battery pack 5 and to the longitudinal direction of the first battery pack 5, as shown in FIGS. 6 and 7. Each of the first to third connection terminals 51 to 53 is provided with a terminal plate 55, adapted for insertion into each of the first to third output terminals 21 to 23 of the first battery pack 5, and with a protection member 56 for protecting the terminal plate 55.

The terminal plate 55 has its major surface substantially parallel to the setting surface of the loading section 43, while having its proximal end supported by the abutment surface 46 of the loading section 43. The terminal plate 55 is fractionated by having a cut-out 57 formed at its distal end so that the distal end is elastically flexible in the width-wise direction.

Figure 9:
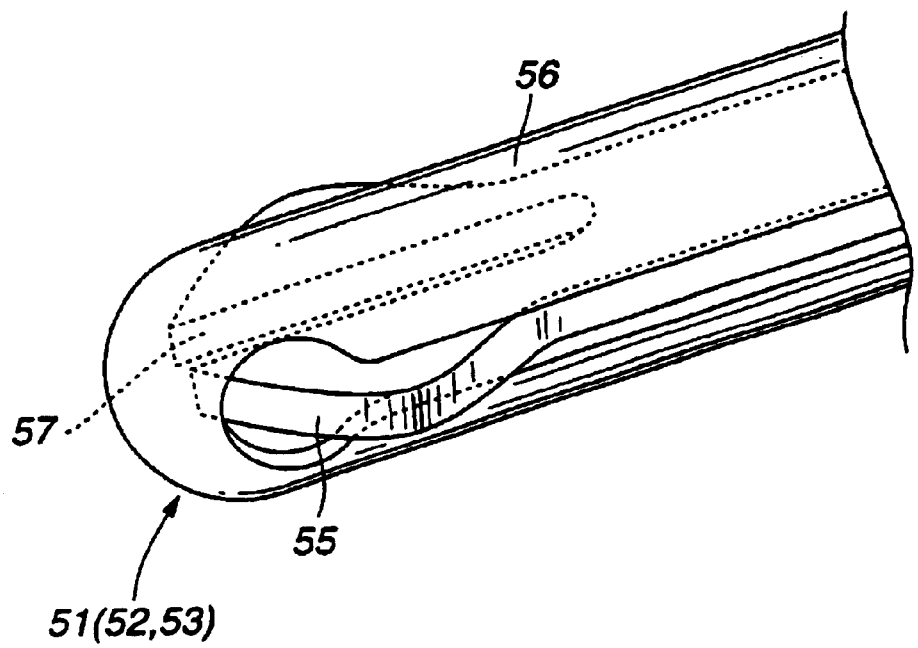
FIG. 9 is a perspective view showing a connection terminal of the terminal section.

The protection member 56 is a substantially semi-tubular substrate bent at a mid portion along the longitudinal direction of the substrate, with the terminal plate 55 in-between, as shown in FIG. 9. The distal end of the terminal plate 55 is elastically flexibly protruded from the folded distal end to both width-wise lateral sides of the protection member 56.

When the connection terminals 51 to 53 are inserted into the output terminals 21 to 23 of the first battery pack 5, the distal ends of the terminal plates 55 are elastically flexed in the width-wise direction to establish the electrical connection by the terminal plates 55 positively compressing against the output terminals.

The connection terminals 51 to 53 are improved in tenacity against the thrusting force from the height-wise direction of the first battery pack 5, corresponding to the depth-wise direction of the loading section 43, when the bottom surface 24 of the first battery pack 5 is erroneously abutted thereon during loading of the first battery pack 5 on the loading section 43. Thus, the terminal plates 55 may be safeguarded against inadvertent destruction.

On the terminal section 44, a cover member 60 for protecting the first to third connection terminals 51 to 53 is mounted for rotation in the direction indicated by arrows a1 and a2 in FIG. 7 relative to the loading section 43.

The cover member 60 is formed of, for example, a synthetic resin material, and includes a substantially rectangular protective piece 61 and supporting pieces 62, 62 for supporting the protective piece 61, as shown in FIGS. 7 and 8. The protective piece 61 of the cover member 60 has, on its surface facing the setting surface 45 of the loading section 43, a surface section 63 inclined along the thickness direction. When the first battery pack 5 is inserted into the loading section 43, the casing 19 is abutted against the protective piece 61, as the casing is inserted, so that the cover member 60 is rotated easily in the direction indicated by arrow a2 in FIG. 7. The cover member 60 has the supporting pieces 62, 62 rotatably supported on the abutment surface 46 of the loading section 43 through a rotary pivot shaft, not shown. On the outer periphery of the rotary pivot shaft of the cover member 60, there is mounted a torsion coil spring, not shown. This torsion coil spring has its one end retained by the abutment surface 46 of the loading section 43, while having its other end retained by the supporting pieces 62, 62 of the cover member 60. Thus, the cover member 60 is biased by the spring force of the torsion coil spring for rotation in the direction indicated by arrow a1 in FIG. 7 and is thereby moved to a position overlying the first to third connection terminals 51 to 53.

Thus, through the cover member 60, the connection terminals 51 to 53 are covered when the first battery pack 5 is not loaded on the loading section 43, so that the connection terminals 51 to 53 are positively protected against possible destruction.

Also, the loading section 43 of the first battery loading device 6 is formed as one with a pair of control projections 65, 66 astride the abutment surface 46 and the setting surface 45 substantially evenly spaced with respect to the width-wise centerline. These control projections 65, 66, engageable with the control recesses 28, 29 of the first battery pack 5, are provided adjacent to the first and second connection terminals 51, 52, as shown in FIGS. 7 and 8.

These control projections 65, 66 are each provided with a first portion, perpendicular to the setting surface 45, and a second portion perpendicular to the first portion, and the hence are each formed to a substantially L-shaped cross-section. These control projections 65, 66 restrict the bottom surface 24 of the first battery pack 5 from assuming a state inclined obliquely relative to the setting surface 45 of the loading section 43. The control projections 65, 66 are configured so that the height $H_1$ thereof in a direction perpendicular to the setting surface 45 will be larger than the height $H_0$ of the outer periphery of the connection terminals 51 to 53.

The loading section 43 of the first battery loading device 6 is formed as one with a first guide projection 68 adjacent to the third connection terminal 53 astride the abutment surface 46 and the setting surface 45 for guiding the insertion of the first battery pack 5. The first guide projection 68 is formed so as to be parallel to the longitudinal direction of the setting surface 45 at a position engageable in the first guide groove 34 in the bottom surface 24 of the loaded first battery pack 5.

The control projections 65, 66 are of a height larger than the connection terminals 51 to 53, and hence are protruded to a height level higher than the connection terminals 51 to 53, as shown in FIGS. 7 and 8. Thus, the control projections 65, 66 prohibit the outer periphery of the casing 19 from erroneously abutting against the connection terminals 51 to 53, when the first battery pack 5 is inserted from the direction perpendicular to the setting surface 45 to prevent possible destruction of the connection terminals 51 to 53. Also, the control projections 65, 66, having the substantially L-shaped cross-section, exhibit sufficient toughness.

Meanwhile, the connection terminals 51 to 53 can be protected if the control projections 65, 66 and the first guide projection 68 are of a height level substantially equal to that of the outer periphery of the connection terminals 51 to 53.

The loading section 43 is also formed as one with a second guide projection 70 astride the abutment surface 46 and the setting surface 45, parallel to the longitudinal direction of the setting surface 45, as shown in FIGS. 6 to 8, for guiding the loading direction of the first battery pack 5. This second guide projection 70 is engageable with the second guide groove 36 of the first battery pack 5 to guide the loading direction.

The loading section 43 of the first battery loading device 6 is formed on both width-wise lateral sides as one with control pawls 72, 72 adapted for engaging with control grooves 37, 37. These control pawls 72, 72 are parallel to the setting surface 45, while extending parallel to the longitudinal direction of the first battery pack 5 when assembled to the first battery loading device 6.

The loading section 43 of the first battery loading device 6 is formed substantially centrally of the setting surface 45 with a discrimination projection 73 engageable with the discrimination recess 30 of the first battery pack 5. This discrimination projection 73 is formed substantially in a rectangular profile. The distal end of the discrimination projection 73 is formed as one with a discrimination lug 74 engageable in the discrimination groove 32 of the discrimination recess 30. This discrimination projection 73 has a size $W_1$ in a direction parallel to the width-wise direction of the setting surface 45 smaller than the width $W_0$ of the discrimination recess 30 of the first battery pack 5 so that the projection 73 can be inserted into the discrimination recess 30. The discrimination projection 73 also is formed at a distance $L_1$ from the abutment surface 46 in the direction perpendicular to the abutment surface 46, as shown in FIG. 6.

The loading section 43 of the first battery loading device 6 is provided with a lock mechanism 75 adapted for holding the first battery pack 5 when the battery pack 5 is loaded in position. This lock mechanism 75 includes a substantially flat-plate-shaped lock member 76 engageable with the first battery pack 5, an operating lever 77 for causing the movement of the lock member 76 relative to the setting surface 45, and a coil spring, not shown, for biasing the operating lever 77 in a direction of engaging with the first lock recess 38 of the first battery pack 5.

The lock member 76 is formed on its major surface with an upstanding lock pawl 79 engageable with the first lock recess 38 of the first battery pack 5. An opening 80 through which the lock pawl 79 of the lock member 76 protrudes above the setting surface 45 is formed substantially centrally of the loading section 43.

The operating lever 77 has its distal end engaged with the lock member 76, while having its other end formed as one with an operating piece 81 adapted for performing a thrusting operation. The setting surface 45 is formed with an operating recess 82 positioned so as to correspond to the back side of the first battery pack 5 when loaded in the loading section 43. In the operating recess 82 is formed the protuberant operating piece 81. Movement of the lock member 76 moves operating lever 77, pushing the operating piece 81 outwardly into the operating recess 82.

When the first battery pack 5 is loaded in the loading section 43, the lock pawl 79 of the lock member 76 is engaged in the first lock recess 38 to disable the movement of the first battery pack 5 from the loading section 43. In this locked position, the operating piece 81 of the operating lever 77 projects outwardly into the operating recess 82, as the lock pawl 79 of the lock member 76 protrudes from the opening 80.

Also, when dismounting the first battery pack 5 loaded on the loading section 43, the lock pawl 79 is disengaged from the lock recess 38 by thrusting the operating piece 81 of the operating lever 77 inwardly causing the lock pawl 79 to become disengaged from the first lock recess 38. The first battery pack 5 is thus rendered movable in the loading section 43 and may be dismounted therefrom.

The above-described lock mechanism 75 is configured so that the lock pawl 79 of the lock member 76 is engageable in the first lock recess 38 of the first battery pack 5. Alternatively, the lock pawl 79 may be configured to be engageable in the second lock recess 39 by design change of the loading section 43.

The operation of loading the above-described first battery pack 5 on the first battery loading device 6 is explained with reference to the drawings.

Figure 10:
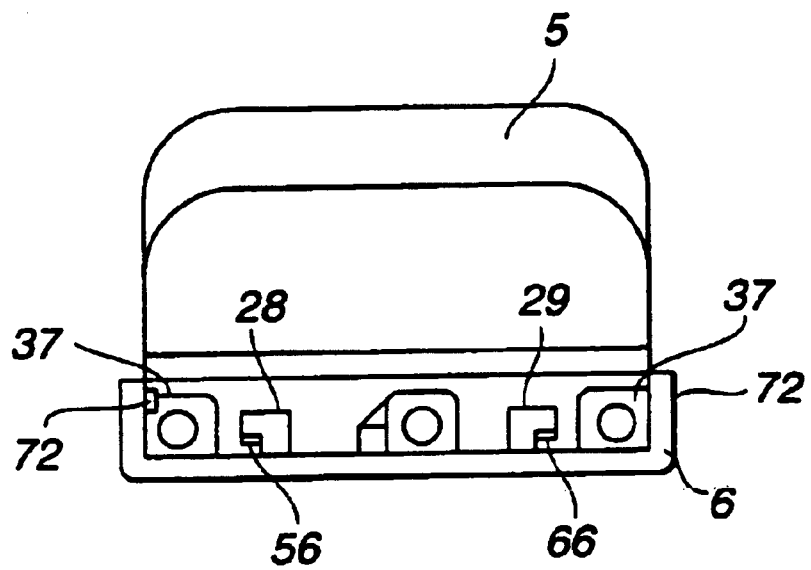
FIG. 10 is a side view looking from the side of the terminal section, and showing the state in which, when the first battery pack is loaded on the first battery loading device, the first battery pack is loaded with a tilt in the longitudinal direction.
Figure 11:
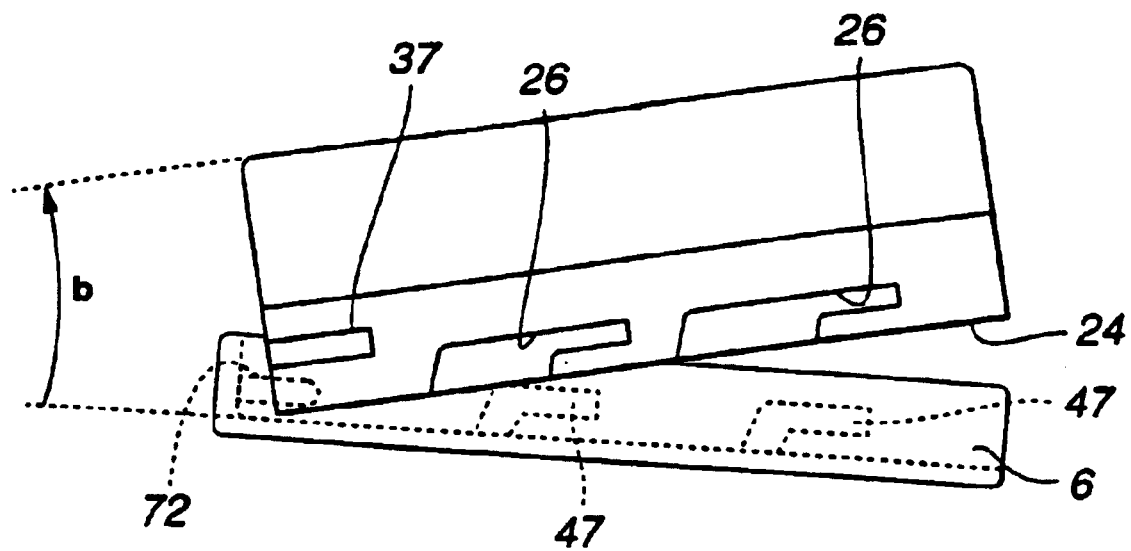
FIG. 11 is a side view showing the state in which, when the first battery pack is loaded on the first battery loading device, the first battery pack is loaded with a tilt in the longitudinal direction.

First, if the first battery pack 5 is improperly loaded into the loading section 43 of the first battery loading device 6, with the bottom surface 24 of the casing 19 being tilted in the direction indicated by arrow b in FIG. 11 corresponding to the longitudinal direction of the bottom surface 24, as shown in FIGS. 10 and 11, the bottom surface 24 of the casing 19 will be abutted against the guide projections 47, while the front surface 20 of the casing 19 will be abutted against the control projections 65, 66. This disables insertion of the battery pack. Moreover, the output terminals 51 to 53 and the connection terminals 21 to 23 are positively prohibited from abutting against optional portions. Therefore, the output terminals 51 to 53 and the connection terminals 21 to 23 are positively safeguarded against possible destruction.

The first battery pack 5 is loaded satisfactorily on the first battery loading device 6, by the guide projections 47 of the loading section 43 being inserted into the respective guide grooves 26 of the casing 19. Specifically, the state of longitudinal tilting of the bottom surface 24 of the casing 19 relative to the setting surface 45 of the loading section 43 is positively controlled, as indicated by arrow b in FIG. 11, so that the longitudinal direction of the bottom surface 24 is parallel to the setting surface 45.

If the first battery pack 5 is loaded on the first battery loading device 6 by applying an extremely large force as the bottom surface 24 of the casing 19 is tilted, and if a large external pressure for detaching the first battery pack 5 is applied, the output terminals 51 to 53 and the connection terminals 21 to 23 are positively safeguarded against possible destruction, since the large external force is applied to the substantially L-shaped control projections 65, 66 of higher tenacity.

Figure 12:
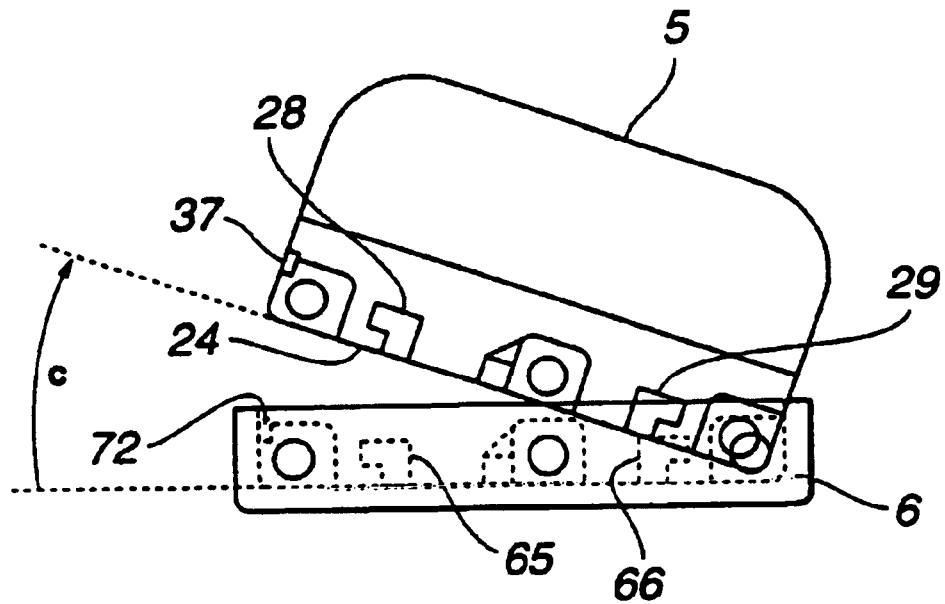
FIG. 12 is a side view looking from the side of the terminal section, and showing the state in which, when the first battery pack is loaded on the first battery loading device, the first battery pack is loaded with a tilt in the width-wise direction.
Figure 13:
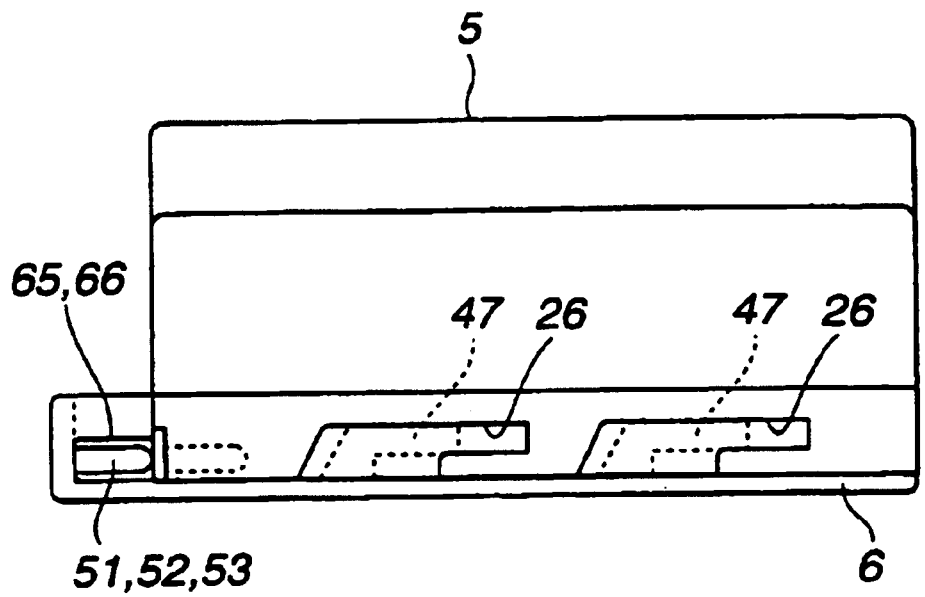
FIG. 13 is a side view showing the state in which, when the first battery pack is loaded on the first battery loading device, the first battery pack is loaded with a tilt in the width-wise direction.

If, when the first battery pack 5 is to be loaded in the loading section 43 of the first battery loading device 6, as shown in FIGS. 12 and 13, it is loaded improperly, with the bottom surface 24 of the casing 19 being tilted in the direction indicated by arrow c in FIG. 12 corresponding to the width-wise direction of the bottom surface 24, at least one of the control pawls 72, 72 is not inserted into the corresponding control groove, with the bottom surface 24 of the casing then abutting against the control pawl 72 and with the front surface 20 of the casing 19 abutting against the control projections. The first battery pack is thus prevented from loading on the first battery loading device 6, such that the output terminals 51 to 53 or the connection terminals 21 to 23 are positively prohibited from abutting against other than the intended portions. This positively prohibits destruction of the output terminals 51 to 53 or the connection terminals 21 to 23.

The control projections 65, 66 of the loading section 43 are inserted into the control recesses 28, 29 of the casing 19, whereby the state of tilt in the width-wise direction of the bottom surface 24 of the casing 19 relative to the setting surface 45 of the loading section 43 is positively controlled, with the width-wise direction of the bottom surface 24 being substantially parallel to the setting surface 45 to permit the first battery pack 5 to be loaded satisfactorily on the first battery loading device 6.

Also, when the first battery pack 5 is loaded in the loading section 43 of the first battery loading device 6, the control pawls 72, 72 of the loading section 43 are engaged in the control grooves 37, 37 of the casing 19, whereby the state of tilt in the width-wise direction of the bottom surface 24 of the casing 19 relative to the setting surface 45 of the loading section 43 is positively controlled, with the width-wise direction of the bottom surface 24 being rendered substantially parallel to the setting surface 45, to permit the first battery pack 5 to be satisfactorily loaded on the first battery loading device 6.

Thus, when the first battery pack 5 is loaded in the loading section 43 of the first battery loading device 6, the first battery pack 5 is rendered substantially parallel to the setting surface 45 of the loading section 43. Stated differently, when the first battery pack 5 is loaded in the loading section 43 of the first battery pack 5, the first battery pack 5 is positively prevented from being loaded in an improper orientation in the loading section 43, with the bottom surface 24 of the casing 19 tilted in the longitudinal direction or in the width-wise direction relative to the setting surface 45.

When the first battery pack 5 is loaded in the loading section 43 of the first battery loading device 6, with the bottom surface 24 of the casing 19 being set on the setting surface 45, the discrimination projection 73 of the setting surface 43 is inserted into the discrimination recess 30 in the bottom surface 24, at the same time as the discrimination lug 74 is inserted into the discrimination groove 32, whereby it is assured that the first battery pack 5 is suited to the first battery loading device 6. When the first battery pack 5 is loaded on the first battery loading device 6, the first battery loading device 6 checks whether or not the first battery pack 5 is appropriate for the first battery loading device 6 based on whether or not the discrimination projection 73 of the setting surface 45 can be inserted into the discrimination recess 30 in the bottom surface 24, that is, based on the relative position between the discrimination recess 30 and the discrimination projection 73, and also based on whether or not the discrimination lug 74 can be inserted into the discrimination groove 32.

Although the discrimination recess 30 and the discrimination projection 73 are discriminated from each other based on their positions in the longitudinal direction of the bottom surface 24 of the casing 19, they may also be discriminated from each other based on their positions in the width-wise direction of the bottom surface 24.

Figure 14A:
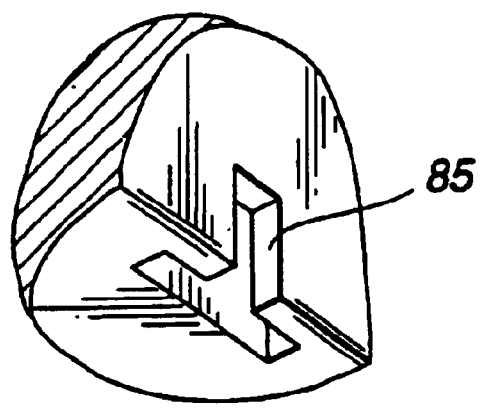
FIGS. 14A, 14B are perspective views showing a discrimination recess and a discrimination projection.
Figure 14B:
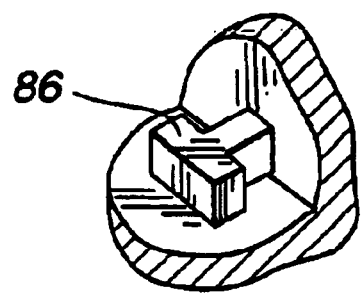
Figure 15A:
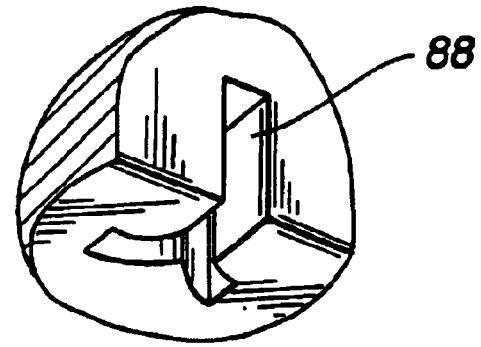
FIGS. 15A, 15B are perspective views showing a modified discrimination recess and a modified discrimination projection.
Figure 15B:
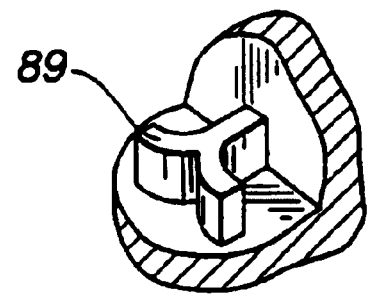

The first battery pack 5 and the first battery loading device 6 are formed so that the control recesses 28, 29 and the control projections 65, 66 have substantially the same L-shaped cross-section. These recesses or projections may, of course, be configured as control recesses 85 or control projections 86 of substantially the same T-shaped cross-section, as shown in FIGS. 14A and 14B, or as control recesses 88 or control projections 89 of substantially the same Y-shaped cross-section, as shown in FIGS. 15A and 15B.

With the first battery pack 5 and the first battery loading device 6, described above, the control recesses 28, 29 and the control projections 65, 66, mating with each other, are of the same profile. Alternatively, the control projections may be shaped to be engaged in portions of the grooves defining the control recess 91, as shown in FIGS. 16A to 16D. For example, control projections 92 to 94 may have a plurality of different configurations, all of which are engageable in the control recess 91, as shown in FIGS. 16A to 16D. That is, the battery pack having the control recess 91 can be loaded on three sorts of the battery loading device, that is on the battery loading devices having the control projections 92 to 94.

Alternatively, control projections engageable with portions of the substantially T-shaped control recess 96, as shown in FIGS. 17A to 17C, may also be used. The control recess 96 may be formed with plural control recesses that may be engaged by control projections 97, 98, as shown in FIGS. 17A to 17C. That is, the battery pack having the control recess 96 may be loaded on two sorts of the battery loading device having the control projection 97 or 98.

In the above-described first battery pack 5 and the first battery loading device 6, the control recesses 28, 29 and the control projections 65, 66 are formed line-symmetrically with respect to substantially the centerline in the width-wise direction of the bottom surface 24. Of course, these recesses or projections may also be formed to the same profile at corresponding unequal positions from the width-wise centerline of the bottom surface 24.

With the battery loading device according to the present invention, in which the state of tilt in the width-wise direction of the first battery pack 5 relative to the setting surface 45 of the loading section 43 of the first battery loading device 6 can be controlled positively, the bottom surface 24 of the first battery pack 5 can be positively prohibited from being inserted with a tilt in the width-wise direction relative to the setting surface 45 of the loading section 43. Thus, with the present battery loading device, it is possible to prevent possible destruction of the output terminals 21 to 23 and the connection terminals 51 to 53 of the first battery pack 5 and the first battery loading device 6.

Referring to the drawings, modifications of the battery pack and the battery loading device according to the present invention will be explained in detail. Meanwhile, in the following description of the modifications of the battery pack and the battery loading device, parts or components which are the same as those of the first embodiment are depicted by the same reference symbols and are not explained specifically.

Figure 18:
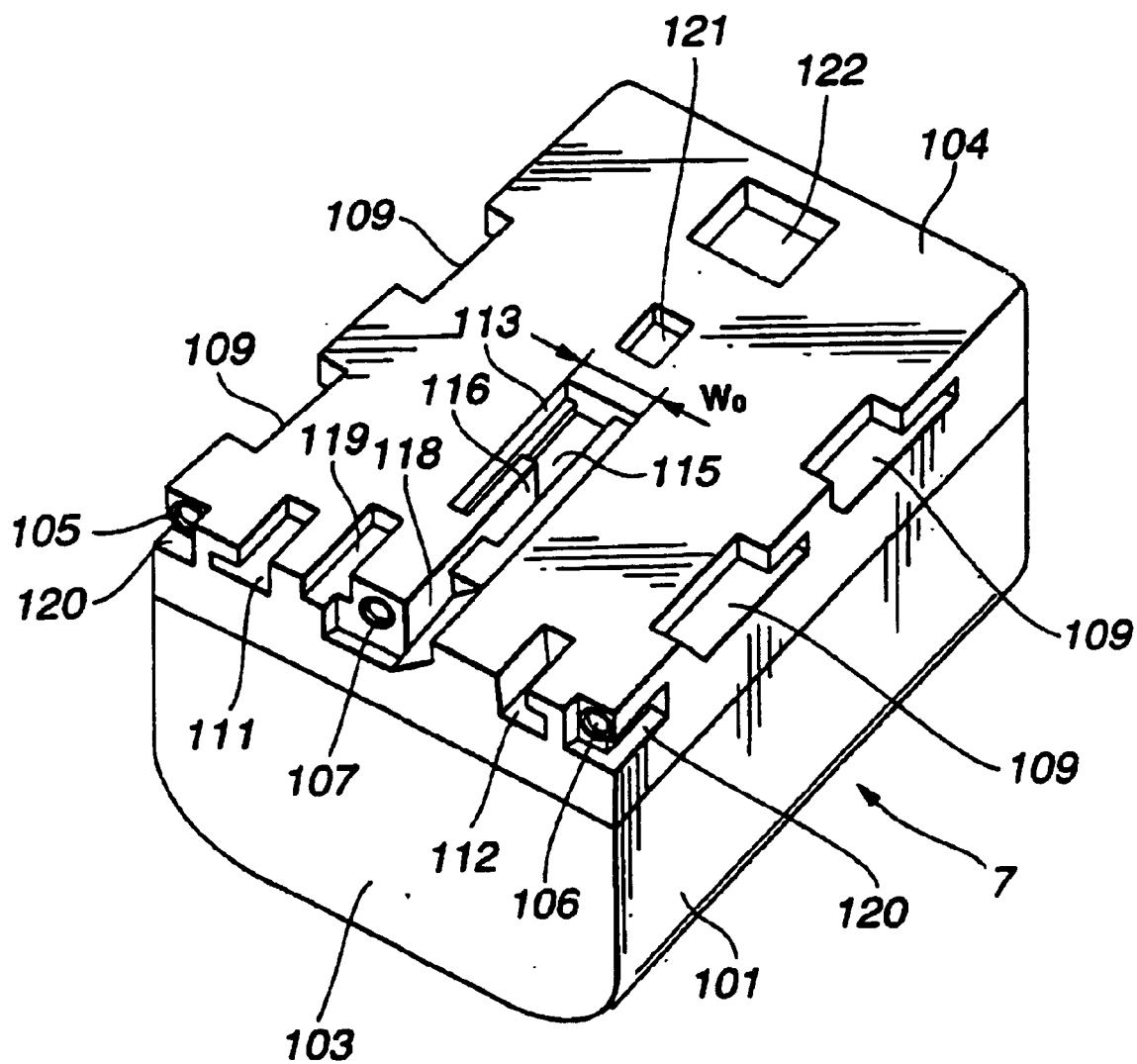
FIG. 18 is a perspective view looking from the bottom side and showing a second battery pack.

Referring to FIG. 18, the second battery pack 7 is of the standard charging capacity, and is of a thickness smaller than the first battery pack 5.

The second battery pack 7 includes a casing 101, housing a battery cell in its inside, and first to third output terminals 105 to 107 provided on a front surface 103 of the casing 101 and which are connected to the battery cell. The casing 101 is formed with guide grooves 109, 109 for guiding the insertion direction into the battery loading device.

In the front surface 103 of the casing 101 of the second battery pack 7, there are formed control recesses 111, 112, as shown in FIG. 18, for controlling the state of tilt of the bottom surface 104 in the width-wise direction relative to the battery loading device.

At a mid portion of the bottom surface 104 of the casing 101 of the second battery pack 7, there is formed a discrimination recess 113 for discriminating whether or not the battery loading device is appropriate for loading battery pack 7. In the bottom surface of the discrimination recess 113 is formed a substantially rectangular groove 115 on substantially the centerline in the width-wise direction of the casing 101, while a step is formed on each side of the recess in the width-wise direction of the bottom surface 104. This discrimination recess 113 has a width $W_0$ along the width of the bottom surface 104.

In the discrimination recess 113, essential to the second battery pack 7, there is formed as one a discrimination lug 116 projecting parallel to the longitudinal direction from the opening edge of the recess 113 which is parallel to the front surface 103.

In the bottom surface 104 of the casing 101, there are formed a first guide groove 118 and a second guide groove 119, adjacent to the third output terminal 107, for guiding the loading direction to the battery loading device. In both lateral sides in the width-wise direction of the casing 101 are formed control grooves 120, 120 for controlling the tilt in the width-wise direction of the bottom surface 104 relative to the battery loading device. The grooves 120, 120 are opened in the front surface 103 and are substantially parallel to the bottom surface 104.

In the bottom surface 104 of the casing 101 are formed a first lock recess 121 and a second lock recess 122 which are engaged by the battery loading device when the casing 101 is loaded thereon.

Figure 19:
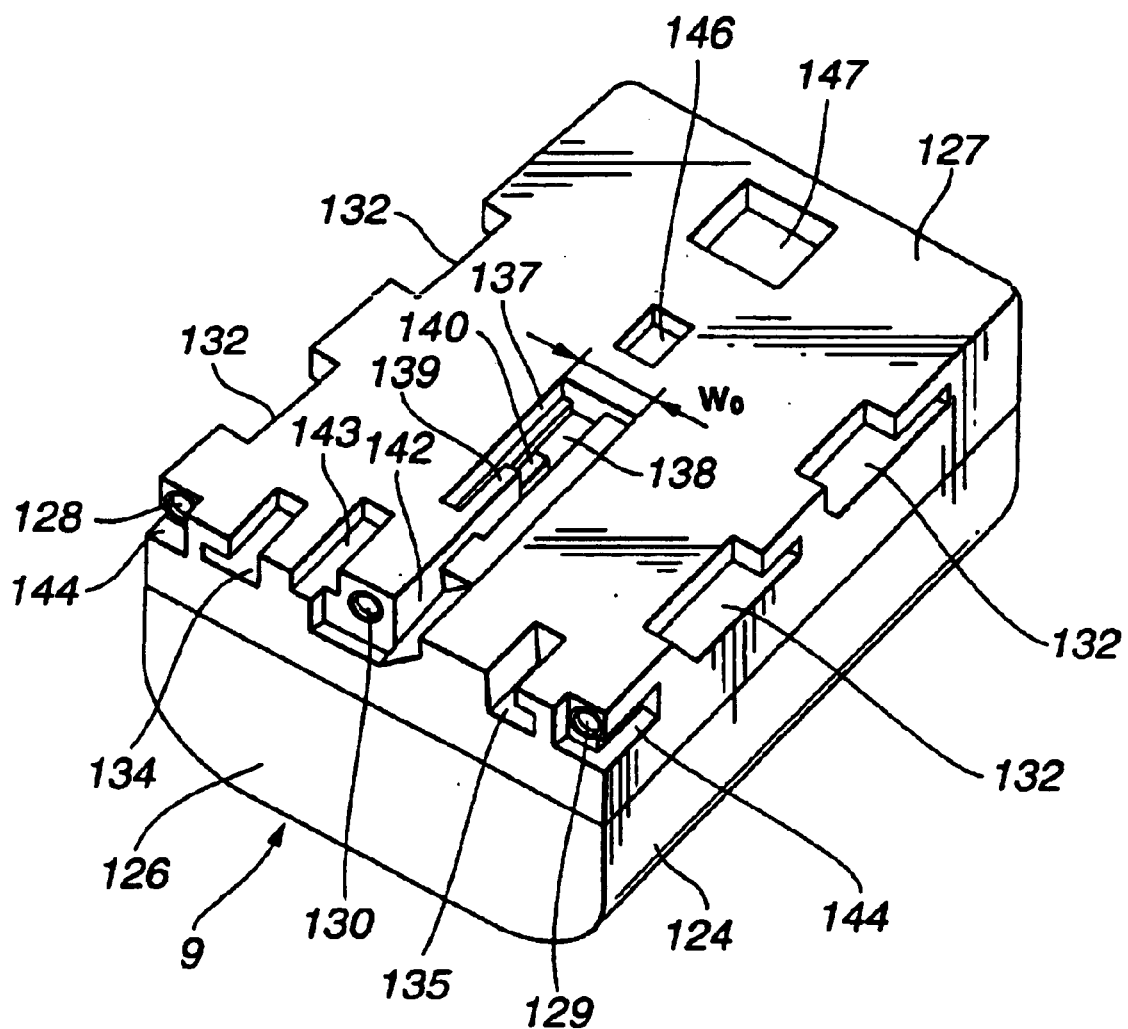
FIG. 19 is a perspective view looking from the bottom side and showing a third battery pack.

A third battery pack 9, shown in FIG. 19, is of a low charging capacity, and is of a smaller thickness than the second battery pack 7, as the standard type battery pack. The third battery pack 9 includes a casing 124, housing a battery cell therein, and first to third output terminals 128 to 130, provided on a front surface 126 of the casing 124 and which are connected to the battery cell. In both lateral sides in the width-wise direction of the casing 124 are formed guide grooves 132, 132 for guiding the loading direction of the casing relative to the battery loading device.

In the front surface 126 of the casing 124 of the third battery pack 9, there are formed control recesses 134, 135, symmetrically positioned relative to substantially the centerline in the width-wise direction, as shown in FIG. 19, for controlling the state of tilt in the width-wise direction of the bottom surface 127 relative to the battery loading device when loading the casing on the appropriate battery loading device.

At a mid portion of the bottom surface 127 of the casing 124 of the third battery pack 9 is formed a discrimination recess 137, as shown in FIG. 19, for discriminating whether or not the battery loading device is appropriate for the casing 124. In the bottom surface of the discrimination recess 137 is formed a discriminating groove 138, substantially rectangular in profile, substantially on the centerline in the width-wise direction of the casing 124. On both sides of the recess in the width-wise direction of the bottom surface 127 are formed steps. The discriminating recess 137 has a width $W_0$ parallel to the width-wise direction of the bottom surface 127.

In the discriminating recess 137, essential to the third battery pack 9, there is formed a discriminating lug 139 projecting from the opening edge of the recess, which is parallel to the front surface 126, in a direction parallel to the longitudinal direction of the casing 124. In the distal end in the longitudinal direction of the discriminating lug 139 is formed a discriminating recess 140.

The casing 124 is formed with a first guide groove 142 and a second guide groove 143, adjacent to the third output terminal 130, for guiding the loading of the casing relative to the battery loading device. In both lateral sides along the width of the casing 124 are formed control grooves 144, 144 for controlling the tilt in the width-wise direction of the bottom surface 127 relative to the battery loading device. The control grooves 144, 144 are opened on the front surface 126 and are substantially parallel to the bottom surface 127.

In the bottom surface 127 of the casing 124 are also formed a first lock recess 146 and a second lock recess 147 which are engaged by the battery loading device when the casing is loaded thereon.

Figure 20:
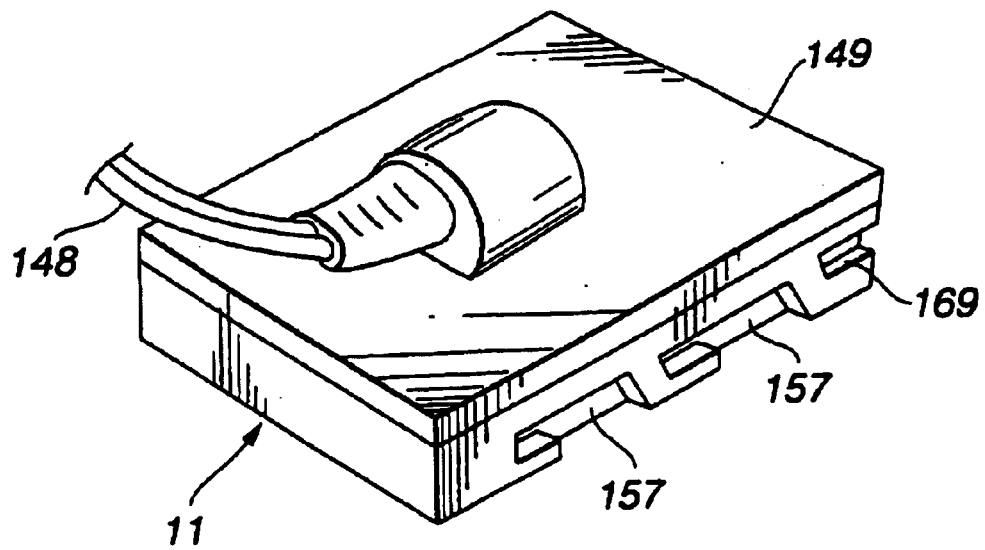
FIG. 20 is a perspective view showing a battery plate.
Figure 21:
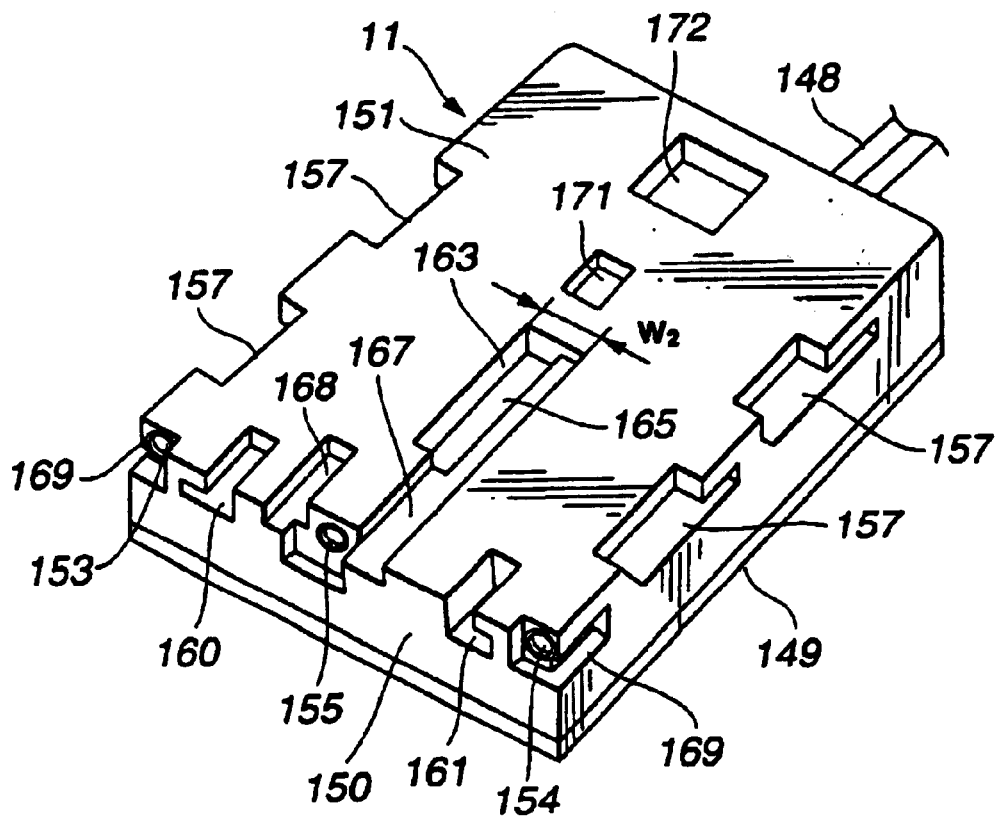
FIG. 21 is a perspective view looking from the bottom side and showing the battery plate.

A battery plate used for connection to a further external power source, such as an AC power source for household use, is now explained by referring to the drawings. Referring to FIGS. 20 and 21, the battery plate 11 is of a substantially rectangular plate shape and includes a connection terminal section 148 for connection to a variety of external power sources, a casing 149 provided with the connection terminal section 148 and first to third output terminals 153 to 155 connected to the connection terminal section 148.

The connection terminal section 148 includes a wiring cord for connection to an AC adapter, not shown. In both lateral sides in the width-wise direction of the casing 149 are formed guide grooves 157 for guiding the casing as it is loaded on the battery loading device.

In a front surface 150 of the casing 149 of the battery plate 11, there are formed control recesses 160, 161 symmetrically positioned relative to substantially the centerline in the width-wise direction thereof, as shown in FIG. 21. The control recesses 160, 161 are used for controlling the state of tilt in the width-wise direction of the bottom surface 151 relative to the battery loading device when loading the casing on the appropriate battery loading device.

At a mid portion of the bottom surface 151 of the casing 149 of the battery plate 11, there is formed a discriminating recess 163 for discriminating whether the casing is appropriate for loading the battery loading device. In the bottom surface of the discriminating recess 163 is formed a substantially rectangular discriminating groove 165 on substantially the centerline in the width-wise direction of the casing 149. On one side of recess 163 in the width-wise direction of the bottom surface 151 is formed a step. The discriminating recess 163 has a size $W_2$ parallel to the width of the bottom surface 151 which is smaller than the width $W_0$ of each of the discriminating recesses 30, 113, 137 of the above-described battery packs 5, 7, 9.

In the bottom surface 151 of the casing 149 are formed a first guide groove 167 and a second guide groove 168, adjacent to the third output terminal 155, for guiding the casing as it is loaded on the battery loading device. The first guide groove 167, which is planar and contiguous to the step in the discriminating recess 163, has a profile different from that of the first guide grooves 30, 113, 137 of the above-described battery packs 5, 7, 9.

In both lateral sides in the width-wise direction of the casing 149 are formed control grooves 169, 169 for controlling the tilt in the width-wise direction of the bottom surface 151 relative to the battery loading device. The control grooves are opened on the front surface 150 and are substantially parallel to the bottom surface 151.

In the bottom surface 151 of the casing 149 are formed a first lock recess 171 and a second lock recess 172, engaged by the battery loading device on loading the casing thereon.

The battery plate 11, constructed as described above, is loaded on an appropriate battery loading device, and is connected via an AC adapter to an external power source or a large-sized battery, to supply the power from the external power source directly to the main body portion of the device.

Figure 22:
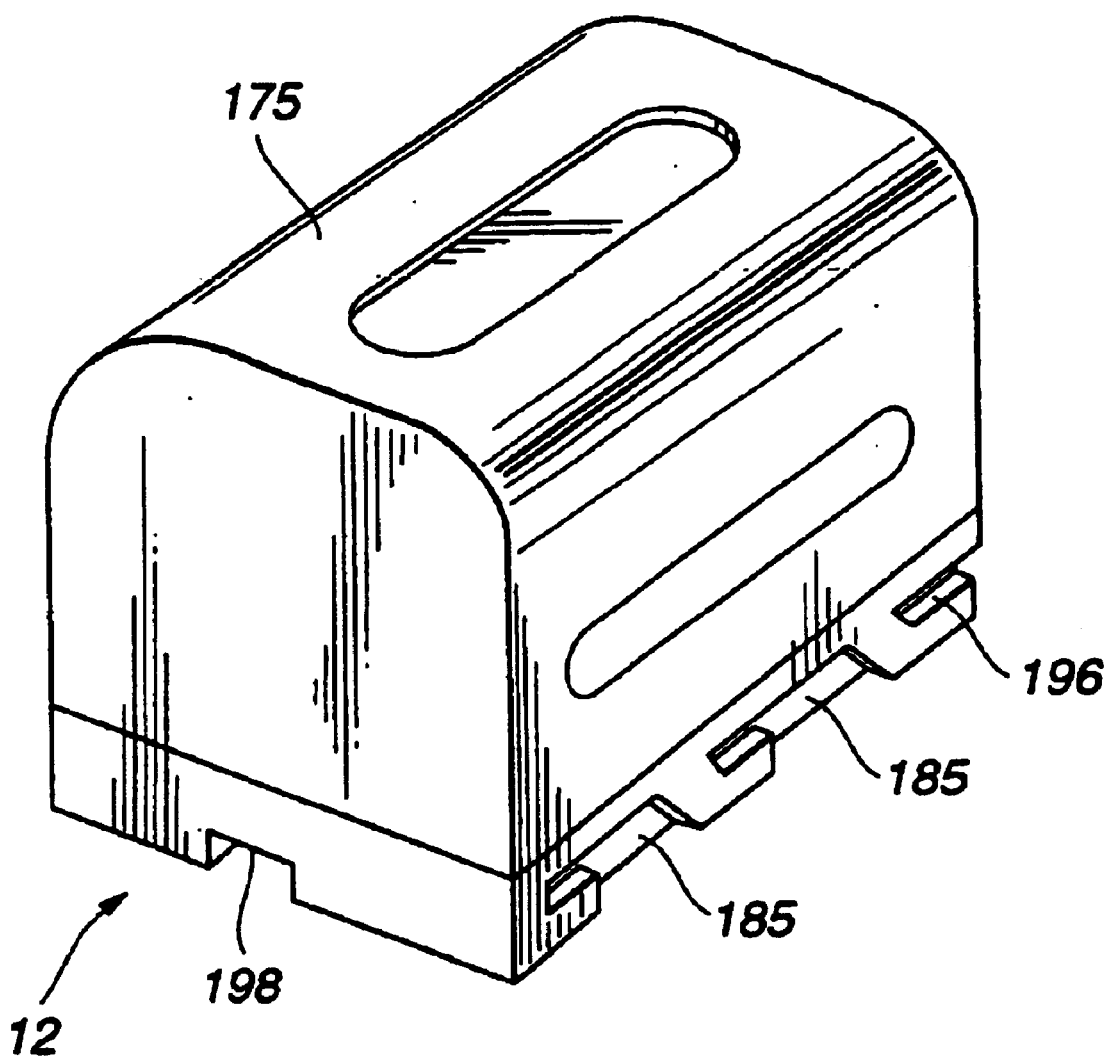
FIG. 22 is a perspective view showing a second battery pack.
Figure 23:
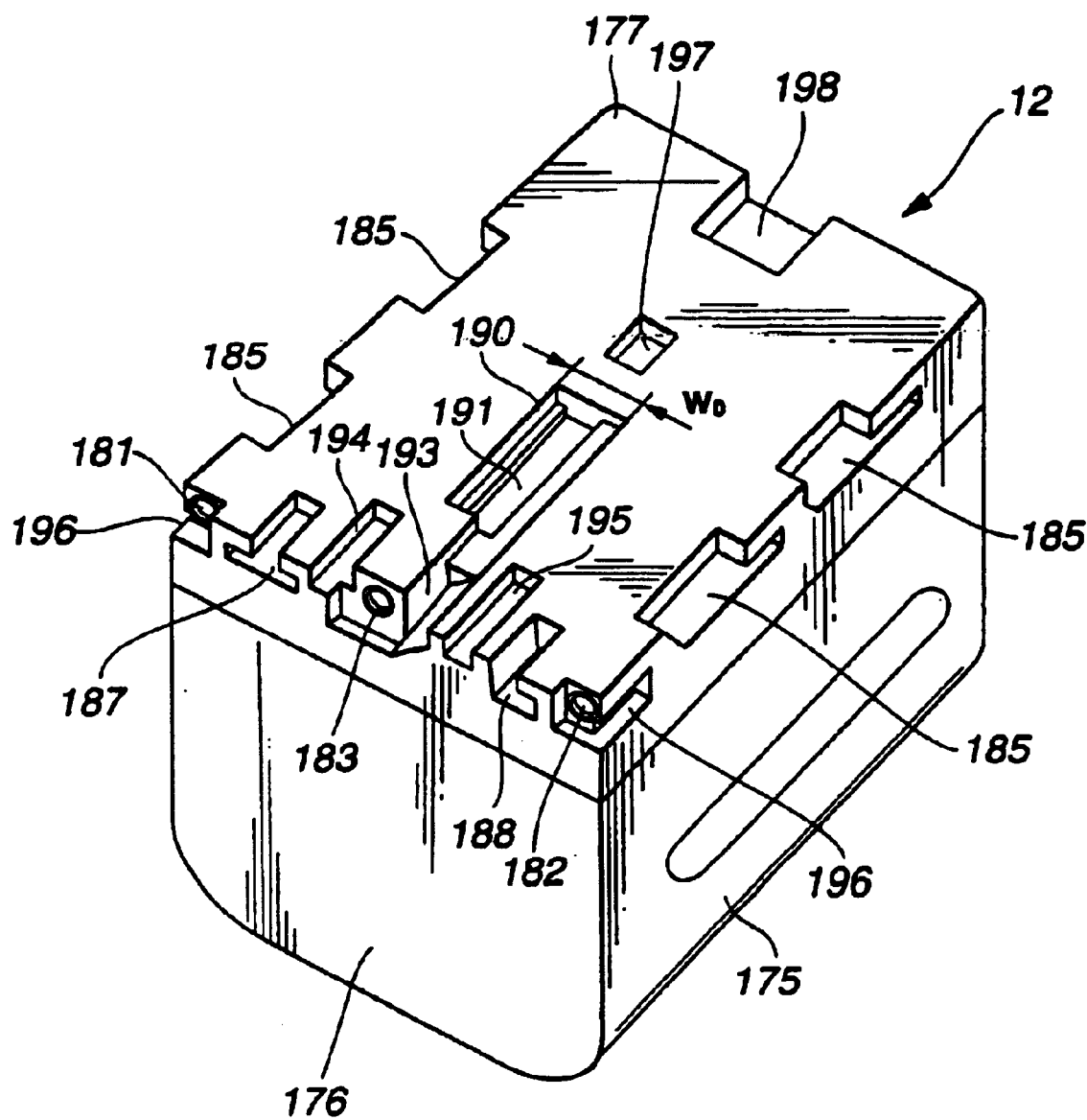
FIG. 23 is a perspective view looking from the bottom side and showing the second battery pack.

A fourth battery pack 12 is configured substantially similarly to the first battery pack 5, and has a casing 175 with a bottom surface 177. Referring to FIGS. 22 and 23, the fourth battery pack 12 has a longitudinal length which is smaller from the front surface side than that of the first battery pack 5 shown in FIGS. 4 and 5, as indicated by a broken line shown in FIG. 4.

This fourth battery pack 12 has a casing 175, housing therein the battery cell, and first to third output terminals 181 to 183, which are provided on the front surface 176 of the casing 175 and which are connected to the battery cell. On both lateral sides in the width-wise direction of the casing 175 are formed guide grooves 185 for guiding the casing 175 as it is loaded on the battery loading device.

In the front surface 176 of the casing 175 of the second battery pack 12 are formed control recesses 187, 188 for controlling the state of tilt in the width-wise direction of the bottom surface 177 relative to the battery loading device when loading the casing on the appropriate battery loading device. The control recesses 187, 188 are of substantially T-shaped cross-section and of substantially L-shaped cross-section, respectively.

In a mid portion of the bottom surface 177 of the casing 175 of the fourth battery pack 12, there is formed a discriminating recess 190 for discriminating whether or not the battery loading device is appropriate for loading the casing 175. In the bottom surface of the discriminating recess 190 is formed a substantially rectangular discriminating groove 191, substantially on the centerline in the width-wise direction of the casing 175. On both sides of the recess 190 in the width-wise direction of the bottom surface are formed steps. The discriminating recess 190 has a width $W_0$ parallel to the width of the bottom surface 177.

Adjacent to the third output terminal 183 on the bottom surface 177 of the casing 175, there are formed a first guide groove 193 and a second guide groove 194 for guiding the casing as it is loaded on the battery loading device. In the bottom surface 177 of the casing 175 is formed a discriminating groove 195 adjacent to the first guide groove 193 for discrimination from the first battery pack 5. In both lateral sides in the width-wise direction of the casing 175 are formed control grooves 196, 196 for controlling the tilt in the width-wise direction of the bottom surface 177 relative to the battery loading device. The grooves 196, 196 are opened in the front surface 176 and are extended substantially parallel to the bottom surface 177.

In the bottom surface 177 of the casing 175, there are formed a first lock recess 197 and a second lock recess 198 engaged by the battery loading device on loading the casing on the battery loading device. The second lock recess 198 is formed so that it is opened in the back surface of the casing 175.

A second battery loading device 8, on which can be loaded the above-described first to fourth battery packs 5, 7, 9 and 12, is now explained by referring to the drawings.

Figure 24:
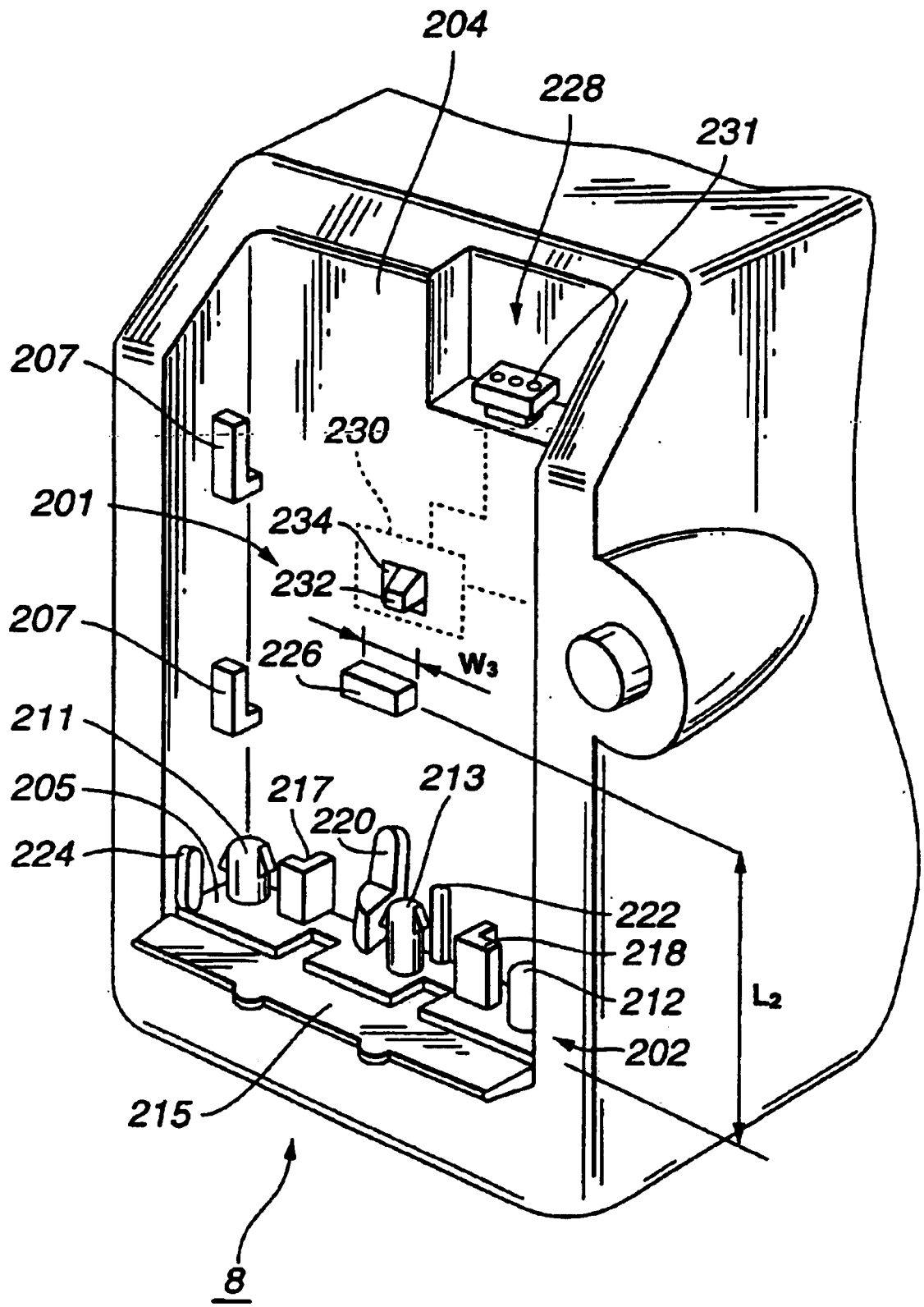
FIG. 24 is a perspective view showing a second battery loading device.

Referring to FIG. 24, the second battery loading device 8 includes a loading section 201, having a setting surface 204 on which to set the battery packs 5, 7, 9 and 12, and a terminal section 202 to which are connected output terminals 21, 22, 23, 105, 106, 107, 128, 129, 130, 181, 182 and 183 of the battery packs 5, 7, 9 and 12, respectively.

On both lateral sides in the width-wise direction of the setting surface 204 of the loading section 201, there are formed guide projections 207 adjacent to the setting surface 204 and engageable in the guide grooves 26, 109, 132, 185 of the battery packs 5, 7, 9, 12.

The terminal section 202 is provided on an abutment surface 205 of the battery loading device adapted to face the front surfaces 20, 103, 126, 176 of the battery packs 5, 7, 9 and 12 when the battery packs are loaded thereon. The terminal section 202 is provided with first, second and third connection terminals 211, 212 and 213, which are connectable to the output terminals 21 to 23, 105 to 107, 128 to 130 and 181 to 183 of the battery packs 5, 7, 9 and 12. On the terminal section 202, a cover member 215 for protecting the connection terminals 211 to 213 is mounted for rotation with respect to the loading section 201, as shown in FIG. 24.

The loading section 201 of the second battery loading device 8 is formed as one with a pair of control projections 217, 218 line-symmetrically with respect to substantially the centerline in the width-wise direction of the setting surface 204, as shown in FIG. 24. These control projections 217, 218 are provided astride the abutment surface 205 and the setting surface 204 so as to be engageable with the control recesses 28, 29, 111, 112, 134, 135, 187, 188 of the battery packs 5, 7, 9 and 12. These control projections 217, 218 are of a height level in a direction perpendicular to the setting surface 204 higher than the outer peripheral parts of the connection terminals 211 to 213 to prevent possible destruction of these connection terminals 211 to 213.

The loading section 201 of the second battery loading device 8 is formed as one with a first guide projection 220 adapted for guiding the battery packs 5, 7, 9 and 12. The first guide projection 220 is provided astride the abutment surface 205 and the setting surface 204, adjacent to the third connection terminal 213 and extending parallel to the longitudinal direction of the setting surface 204. On the first guide projection 220 is formed a step, projected in a direction perpendicular to the setting surface 204, integrally connected to the abutment surface 205. This step has a height level in a direction perpendicular to the setting surface 204 slightly higher than the control projections 217, 218 to prevent possible destruction of the connection terminals 211 to 213.

The loading section 201 of the second battery loading device 8 is formed as one with a second guide projection 222, astride the setting surface 204 and the abutment surface 205, for guiding the loading direction of the battery packs 5, 7, 9, 12. The loading section 201 of the second battery loading device 8 is also formed on both lateral sides in the width-wise direction thereof as one with control pawls 224, 224 engageable in the control grooves 37, 120, 132 and 196 of the battery packs 5, 7, 9 and 12. The control pawls 224, 224 are parallel to the setting surface 204, while being parallel to the longitudinal direction of the setting surface 204. At a mid portion of the setting surface 204 of the loading section 201 of the second battery loading device 8 is integrally formed a discriminating projection 226 engageable in the discriminating recesses 30, 113, 137, 190 of the battery packs 5, 7, 9 and 12.

The discriminating projection 226 is of a width $W_3$ parallel to the width of the setting surface 204 which is larger than the width $W_1$ of the discriminating projection 73 of the first battery loading device 6. This discriminating projection 226 is slightly smaller than the width $W_0$ of the discriminating recesses 30, 113, 137, 190 of the battery packs 5, 7, 9 and 12 and hence can be inserted into the discriminating recesses 30, 113, 137, 190. The discriminating projection 226 is formed at a position spaced a distance $L_2$ larger than the distance $L_1$ of the discriminating projection 73 of the first battery loading device 6 in a direction perpendicular to the abutment surface 205, as shown in FIG. 24.

The loading section 201 of the second battery loading device 8 is provided with a lock mechanism 228 for holding the loaded battery packs 5, 7, 9 and 12. The lock mechanism 228 includes a lock member 230, having a lock pawl 232 for engaging with lock recesses 38, 121, 146, 197 of the battery packs 5, 7, 9 and 12, and an operating piece 231 for actuating this lock member 230. The lock pawl 232 is movably passed through an opening 234 formed in the setting surface 204.

If the first to fourth battery packs 5, 7, 9 and 12 are loaded on the above-described second battery loading device 8, the battery packs are verified to be appropriate and loaded if the discriminating projection 226 is passed through the discriminating recesses 30, 113, 137, 190. If the battery plate 11, verified to be inappropriate, is loaded on the second battery loading device 8, the step of the first guide projection 220 presses against the planar surface of the first guide groove 167 of the battery plate 11 to render insertion of the battery plate 11 impossible. Also, since the width $W_2$ of the discriminating recess 163 of the battery plate 11 is smaller than the width $W_3$ of the discriminating projection 226, the discriminating projection 226 cannot be inserted into the discriminating recess 163. This verifies that the battery plate 11 is inappropriate and renders the insertion of the battery plate 11 impossible. Therefore, only the battery plate 11 is verified to be non-loadable on the second battery loading device 8.

A third battery loading device, on which can be loaded the battery packs 5, 7, 9 and 12 and the battery plate 11, is now explained by referring to the drawings.

Figure 25:
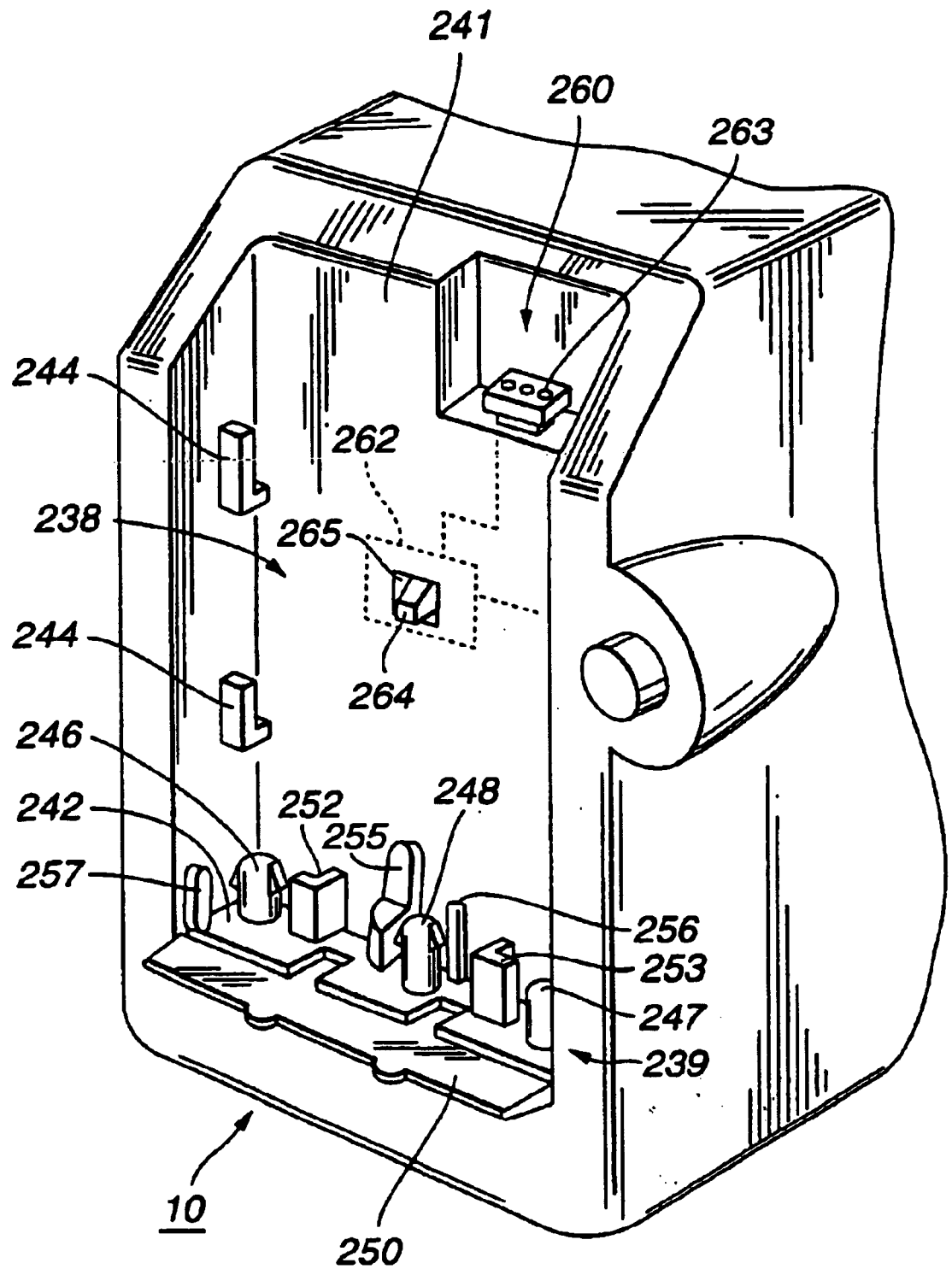
FIG. 25 is a perspective view showing a third battery loading device.

Referring to FIG. 25, the third battery loading device 10 includes a loading section 238, having a setting surface 241 on which to set the battery packs 5, 7, 9 and 12 and the battery plate 11, and a terminal section 239, to which are connected the output terminals 21 to 23, 105 to 107, 128 to 130, 181 to 183 and 153 to 155.

On both width-wise lateral sides of the setting surface 241 of the loading section 239 are formed guide projections 244, adjacent to the setting surface 241, for engaging in the guide grooves 26, 109, 132, 185 and 157 of the battery packs 5, 7, 9, 12 and the battery plate 11.

The terminal section 239 is arranged on an abutment surface 242 adapted to face the front surfaces 20, 103, 126 and 176 of the battery packs 5, 7, 9, 12 and the front surface 150 of the battery plate 11, and includes first, second and third connection terminals 246 to 248, to which are connected output terminals 21 to 23, 105 to 107, 128 to 130, 181 to 183 and 153 to 155 of the battery packs 5, 7, 9, 12 and the battery plate 11. In the terminal section 239, a cover member 250 for protecting the connection terminals 246 to 248 is arranged for rotation with respect to the loading section 239, as shown in FIG. 25.

The loading section 238 of the third battery loading device 10 is formed as one with a pair of control projections 252, 253 line-symmetrically with respect to substantially the width-wise centerline of the setting surface 241, as shown in FIG. 25. The control projections 252, 253 are formed astride the abutment surface 242 and the setting surface 241 so as to be engageable in the control recesses 28, 29, 111, 112, 134, 135, 187, 188, 160, 161 of the battery packs 5, 7, 9, 12 and the battery plate 11. These control projections 252, 253 are of a height level in a direction perpendicular to the setting surface 241 slightly higher than the outer periphery of the connection terminals 246 to 248 to prevent destruction of the connection terminals 246 to 248.

The loading section 238 of the third battery loading device 10 is formed as one with a first guide projection 255, astride the setting surface 241 and the abutment surface 242, adjacent to the third connection terminal 248, for guiding the loading of the battery packs 5, 7, 9, 12 and the battery plate 11.

The loading section 238 of the third battery loading device 10 is formed as one with a second guide projection 256 extending parallel to the longitudinal direction of the setting surface 241 astride the setting surface 241 and the abutment surface 242, as shown in FIG. 25. The second guide projection 256 is adapted for guiding the loading direction of the battery packs 5, 7, 9, 12 and the battery plate 11. On both lateral sides in the width-wise direction of the loading section 238 of the third battery loading device 10 are integrally formed control pawls 257, 257 engageable in control grooves 37, 120, 132, 196, 169 of the battery packs 5, 7, 9, 12 and the battery plate 11. The control pawls 257, 257 are formed parallel to the setting surface 241 and to the longitudinal direction of the setting surface 241. Meanwhile, there is not formed, at a mid portion of the setting surface 241 of the loading section 238 of the third battery loading device 10, a discriminating projection engageable in the discriminating recesses 30, 113, 137, 190, 163 of the battery packs 5, 7, 9, 12 and the battery plate 11. Thus, the battery packs 5, 7, 9, 12 and the battery plate 11 can be set on the setting surface 241 of the third battery loading device 10.

The loading section 238 of the third battery loading device 10 is provided with a lock mechanism 260 for holding the loaded battery packs 5, 7, 9, 12 and the loaded battery plate 11. The lock mechanism 260 includes a lock member 262 having a lock pawl 264 engageable in first lock recesses 38, 121, 146, 197, 171 formed in the battery packs 5, 7, 9, 12 and the battery plate 11, and an operating piece 263 for actuating the lock member 262. The lock pawl 264 is movably passed through an opening 265 formed in the setting surface 241.

The above-described third battery loading device 10 is not formed with discriminating projections adapted for insertion into the discriminating recesses 30, 113, 137, 190, 163, so that, when the battery packs 5, 7, 9, 12 and the battery plate 11 are loaded thereon, these are loaded thereon as being appropriate. Moreover, since there is no step formed on the first guide projection 255 of the third battery loading device 10, it is inserted into the first guide groove 167 of the battery plate 11 so that the battery plate 11 is loaded as being appropriate.

Figure 26:
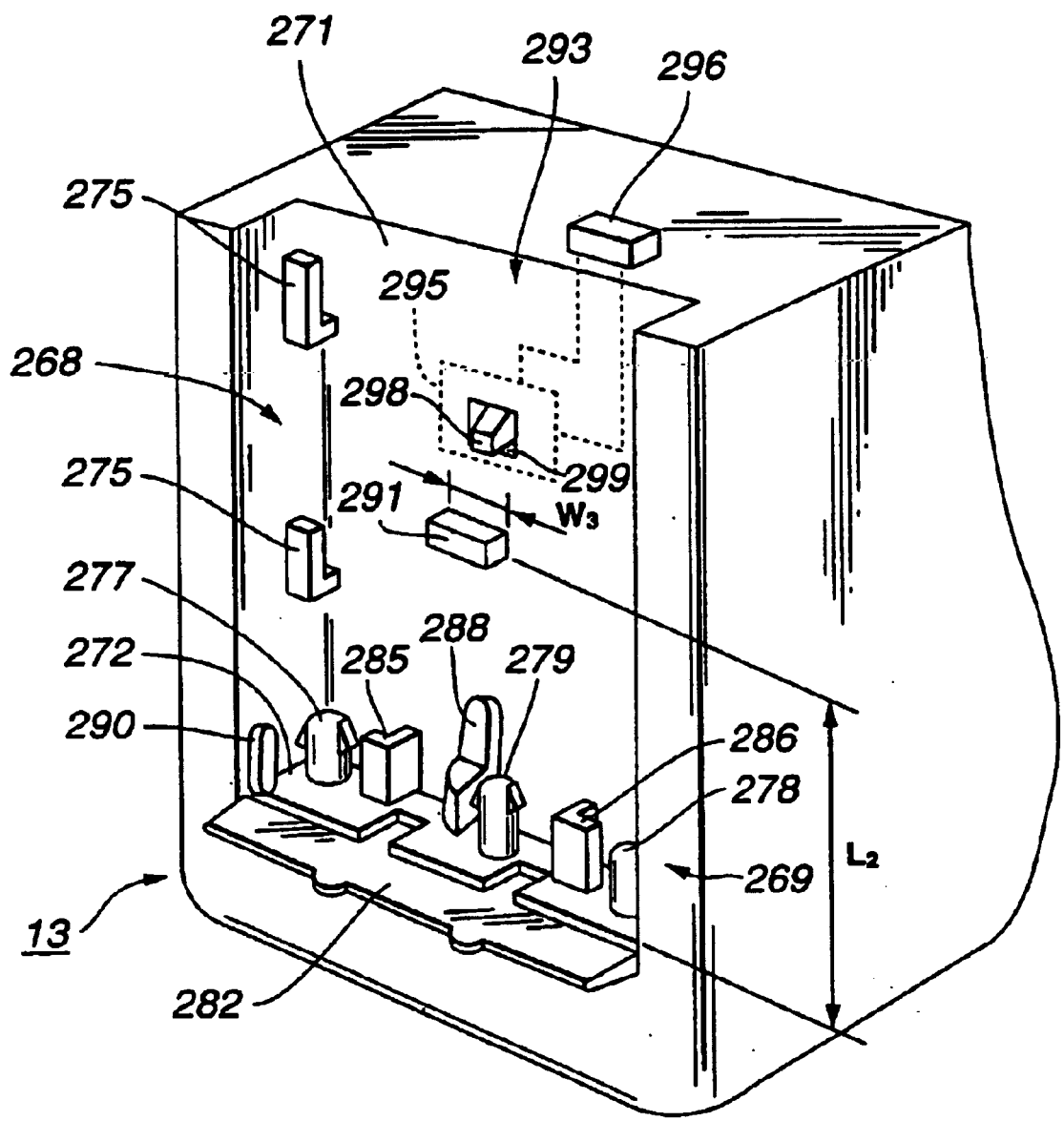
FIG. 26 is a perspective view showing a fourth battery loading device.

A fourth battery loading device 13, on which can be loaded only the above-described fourth battery pack 12, is explained by referring to FIG. 26.

The fourth battery loading device 13 includes a loading section 268, having a setting surface 271 on which to set the fourth battery pack 12, and a terminal section 269 to which are connectable the respective output terminals 181 to 183 of the fourth battery pack 12.

The loading section 268 is formed with guide projections 275, adjacent to both lateral sides in the width-wise direction of the setting surface 271, engageable in the respective guide grooves 185 of the fourth battery pack 12.

The terminal section 269 is provided on an abutment surface 272 adapted to face the front surface 176 of the fourth battery pack 12 when the battery pack is loaded thereon, and includes first to third connection terminals 277 to 279 which are connectable to the output terminals 181 to 183 of the fourth battery pack 12. A cover member 282 for protecting the connection terminals 277 to 279 is rotationally mounted on the terminal section 269 for rotation relative to the loading section 268, as shown in FIG. 26.

The loading section 268 of the fourth battery loading device 13 is formed as one with a pair of control projections 285, 286, astride the abutment surface 272 and the setting surface 271, adapted for engagement in the control recesses 187, 188 of the fourth battery pack 12. These control projections 285, 286 are of a height level in a direction perpendicular to the setting surface 271 higher than the outer periphery of the connection terminals 277 to 279 to prevent destruction of the connection terminals 277 to 279.

The loading section 268 of the fourth battery loading device 13 is formed with a first guide projection 288, astride the abutment surface 272 and the setting surface 271, adjacent to the third connection terminal 279, for guiding the loading of the fourth battery pack 12 in a direction parallel to the longitudinal direction of the setting surface 271. The first guide projection 288 is formed with a step integrally connected to the abutment surface 272 and extending in a direction perpendicular to the setting surface 271. This step has a height level slightly higher than the control projections 285, 286 to prevent possible destruction of the connection terminals 277 to 279.

On both lateral sides in the width-wise direction of the loading section 268 of the fourth battery loading device 13, there are integrally formed control pawls 290, 290 engageable in the control grooves 196, 196 of the fourth battery pack 12. The control pawls 290, 290 are parallel to the setting surface 271 and to the longitudinal direction of the setting surface 271. At a mid portion of the setting surface 271, the loading section 268 of the fourth battery loading device 13 is formed as one with a discriminating projection 291 engageable in a discriminating recess 190 of the fourth battery pack 12.

The discriminating projection 291 has a width $W_3$ larger than the width $W_1$ of the discriminating projection 73 of the first battery loading device 6. The discriminating projection 291 is formed at a site spaced a distance $L_2$ larger than the distance $L_1$ of the discriminating projection 73 of the first battery loading device 6, as shown in FIG. 26.

The loading section 268 of the fourth battery loading device 13 is provided with a lock mechanism 293 for holding the loaded fourth battery pack 12. The lock mechanism 293 includes a lock member 295 having a lock pawl 298 engageable in a lock hole 197 of the fourth battery pack 12, and an operating piece 296 for actuating the lock member 295. The lock pawl 298 is movably passed through an opening 299 formed in the setting surface 271.

If the fourth battery pack 12 is loaded on the above-described fourth battery loading device 13, the discriminating projection 291 will be inserted into the discriminating recess 190, whereby only the fourth battery pack 12 will be verified to be appropriate and loaded.

If the first to third battery packs 5, 7 and 9 and the battery plate 11, verified to be inappropriate, are loaded erroneously, the control projection 286 will be pressed against the front surfaces 20, 103, 126, 150 of the casings 19, 101, 124, 149 to prevent the insertion of the battery packs 5, 7 and 9 or the battery plate 11, whereby the first to third battery packs 5, 7 and 9 and the battery plate 11 will be verified to be inappropriate and cannot be loaded.

Finally, the first battery loading device 6 permits the loading only of the first battery pack 5 and the battery pack 11, whilst the second to fourth battery packs 7, 9, 12 are verified to be inappropriate. If the first battery pack 5 and the battery plate 11 are loaded on the first battery loading device 6, the discriminating projection 73 and the discrimination lug 74 will be inserted into the discriminating recesses 30, 163, so that the first battery pack 5 and the battery plate 11 will be verified to be appropriate and loaded.

If the second battery pack 7, verified to be inappropriate, is loaded on the first battery loading device 6, the discrimination lug 74 of the discriminating projection 73 abuts the discriminating projection 116 of the discriminating recess 113 to demonstrate that it cannot be inserted. Therefore, the second battery pack 7 is verified to be inappropriate and non-loadable. If the third battery pack 9, verified to be inappropriate, is loaded on the first battery loading device 6, the discrimination lug 74 of the discriminating projection 73 abuts the discriminating projection 139 of the discriminating recess 137 to demonstrate the non-loadability, so that the third battery pack 9 is verified to be inappropriate and non-insertable.

The battery packs 5, 7, 9, 12 and the battery plate 11 are configured to be loaded on a variety of battery loading devices provided on the video camera apparatus 1. Alternatively, the battery packs 5, 7, 9, 12 and the battery plate 11 may be loaded on an illumination device mounted on the video camera apparatus 1. This illumination device, on which the battery packs 5, 7, 9, 12 and the battery plate 11 may be loaded, is now explained by referring to the drawings.

Figure 27:
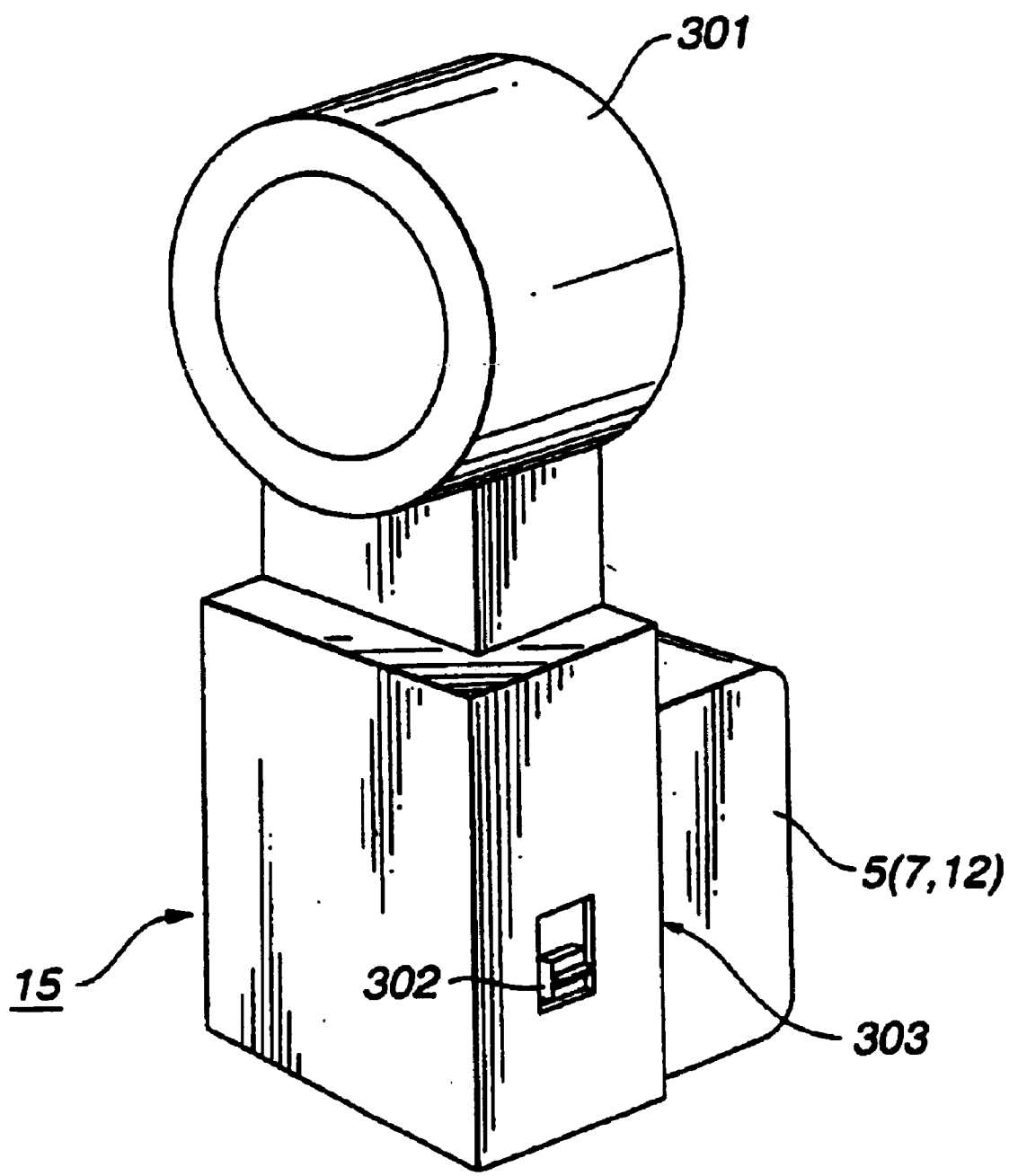
FIG. 27 is a perspective view showing a first illumination device.
Figure 28:
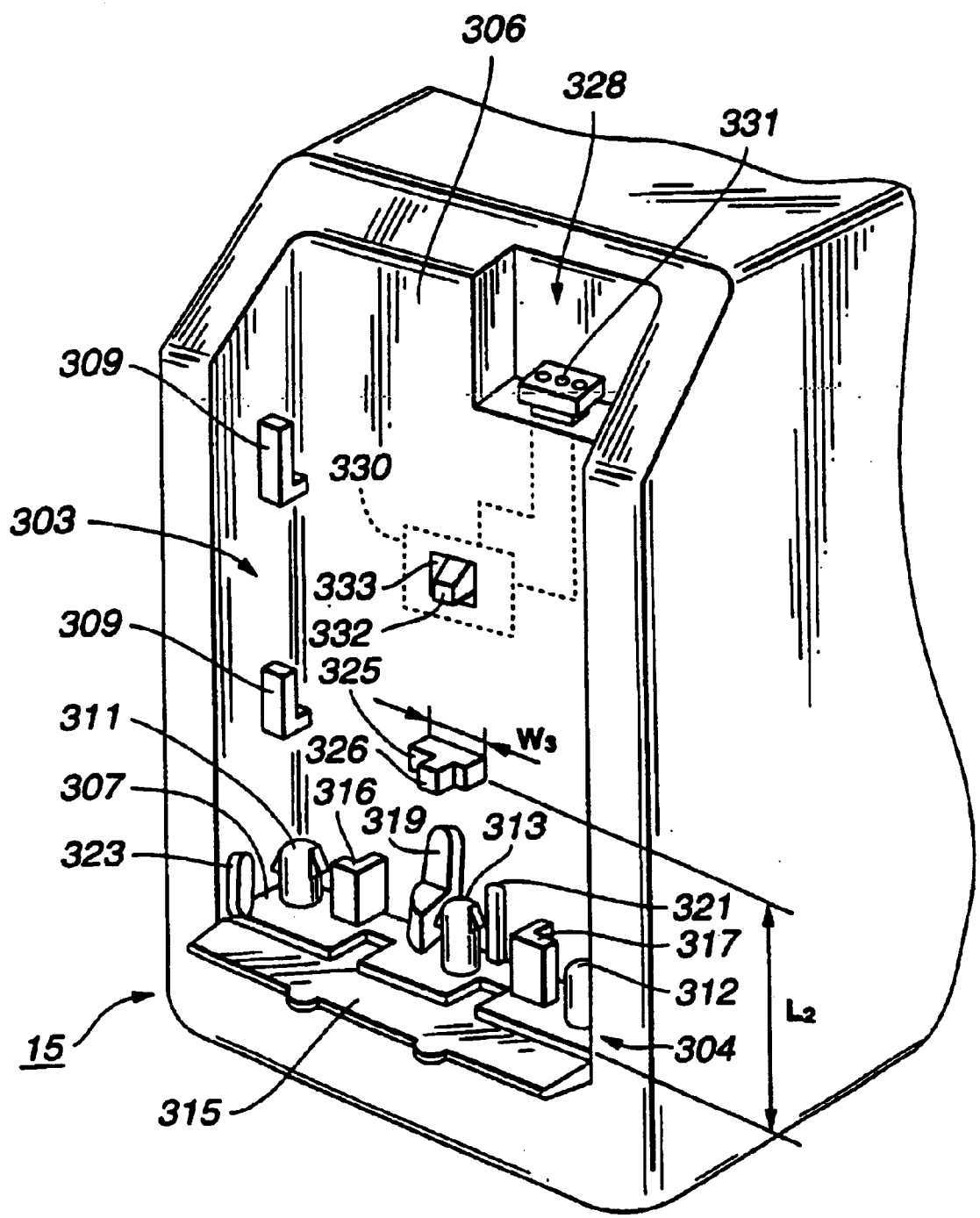
FIG. 28 is a perspective view showing a fifth battery loading device.

Referring to FIGS. 27 and 28, a first illumination device 15 includes an illumination unit 301 for illuminating an object, a changeover switch 302 for switching the operating state of the illumination unit 301, a loading unit 303 on which the first and second battery packs 5, 7 can be loaded and a terminal unit 304 to which may be connected output terminals 21 to 23 and 105 to 107 of the battery packs 5 and 7.

The loading unit 303 is provided with guide projections 309, shown in FIG. 28, which are engageable with guide grooves 26, 109 of the battery packs 5, 7. The guide projections 309 are provided on both lateral sides in the width-wise direction of the setting surface 306 in adjacency to the setting surface 306.

The terminal unit 304 is provided on an abutment surface 307 adapted to face the front surfaces 20, 103 of the loaded battery packs 5, 7, and includes first to third connection terminals 311 to 313 to which output terminals of the battery packs 5, 7 may be connected. A cover member 315 for protecting the connection terminals 311 to 313 is mounted for rotation relative to the loading unit 303, as shown in FIG. 28.

The loading unit 303 of the first illumination device 15 is provided with a pair of control projections 316, 317, line-symmetrically relative to substantially the centerline in the width-wise direction of the setting surface 306, as shown in FIG. 28. The control projections 316, 317 are formed as one with the loading unit 303 astride the abutment surface 307 and the setting surface 306 so as to be engageable with the control recesses 28, 29, 111, 112 of the battery packs 5, 7. The control projections 316, 317 are of a height level in a direction perpendicular to the setting surface 306 higher than the outer periphery of the connection terminals 311 to 313 to prevent destruction of the connection terminals 311 to 313.

The loading unit 303 of the first illumination device 15 is formed as one with a first guide projection 319 for guiding the loading of the battery packs 5, 7 in a direction parallel to the longitudinal direction of the setting surface 306. The first guide projection 319 is formed astride the abutment surface 307 and the setting surface 306 and adjacent to the third connection terminal 313. A step projecting in a direction perpendicular to the setting surface 306 is provided on the first guide projection 319 and is integrally connected to the abutment surface 307. This step has a height level in a direction perpendicular to the setting surface 306 slightly higher than the control projections 316, 317 to prevent the destruction of the connection terminals 311 to 313.

The loading unit 303 of the first illumination device 15 is formed as one with a second guide projection 321 extending parallel to the longitudinal direction of the setting surface 306, as shown in FIG. 28. The second guide projection 321 is formed astride the setting surface 306 and the abutment surface 307 for guiding the loading of the battery packs 5, 7. The loading unit 303 of the first illumination device 15 is formed as one with control pawls 323, 323 on both widthwise lateral sides for engaging the control grooves 37, 120 of the battery packs 5, 7. The control pawls 323, 323 are parallel to the setting surface 306 and to the longitudinal direction of the setting surface 306. At a mid portion of the setting surface 306 of the loading unit 303 of the first illumination device 15 is integrally formed a discriminating projection 325 engageable in the discriminating recesses 30, 113 of the battery packs 5, 7. The distal end of the discriminating projection 325 is formed with a discriminating lug 326.

This discriminating projection 325 is of a width $W_3$ larger than the width $W_1$ of the discrimination projection 73 of the first battery loading device 6. The discriminating projection 325 is formed at a position spaced a distance $L_2$ larger than the distance $L_1$ of the discriminating projection 73 of the battery loading device 6 in a direction perpendicular to the abutment surface 307.

The loading unit 303 of the first illumination device 15 is provided with a lock mechanism 328 for holding the loaded battery packs 5, 7. The lock mechanism 328 includes a lock member 330 having a lock pawl 332 engageable in the first lock holes 38, 121 of the battery packs 5, 7 and an operating piece 331 for actuating the lock member 330. The lock pawl 332 is movably passed through the opening 333 formed in the setting surface 306.

If the first, second or fourth battery packs 5, 7, 12 are loaded on the loading unit 303 of the first illumination device 15, the discriminating projection 325 will be inserted into the discriminating recesses 30, 113, 190 to demonstrate that the first, second and fourth battery packs are verified to be appropriate and loaded.

If the third battery pack 9, verified to be inappropriate, is erroneously loaded on the loading unit 303 of the first illumination device 15, the discriminating lug 326 of the discriminating projection 325 will be pressed against the discriminating recess 140 of the discriminating projection 139 in the discriminating recess 137 and demonstrates that it cannot be inserted. Thus, the third battery pack 9 is verified to be inappropriate and non-loadable.

If the battery plate 11, verified to be inappropriate, is erroneously loaded on the loading unit 303 of the first illumination device 15, the step on the first guide projection 319 will abut the planar surface of the first guide groove 167 of the battery plate 11, and thus demonstrates that it cannot be inserted. Moreover, since the width $W_2$ of the discriminating recess 163 of the battery plate 11 is smaller than the width $W_3$ of the discriminating projection 325, the discriminating projection 325 cannot be inserted into the discriminating recess 163. Thus, the battery plate 11 is verified to be inappropriate and non-loadable.

Therefore, the loading unit 303 of the first illumination device 15 is configured so that the high capacity type first battery pack 5 and the standard type second and fourth battery packs 7, 12 can be loaded thereon. Since the illumination unit 301 of the first illumination device 15 consumes much power, the third battery pack 9 having a lower charging capacity and the battery plate 11 are verified to be inappropriate.

Referring to the drawings, a second illumination device 17, having a larger illumination volume than that of the above-described first illumination device 15, is now explained.

Figure 29:
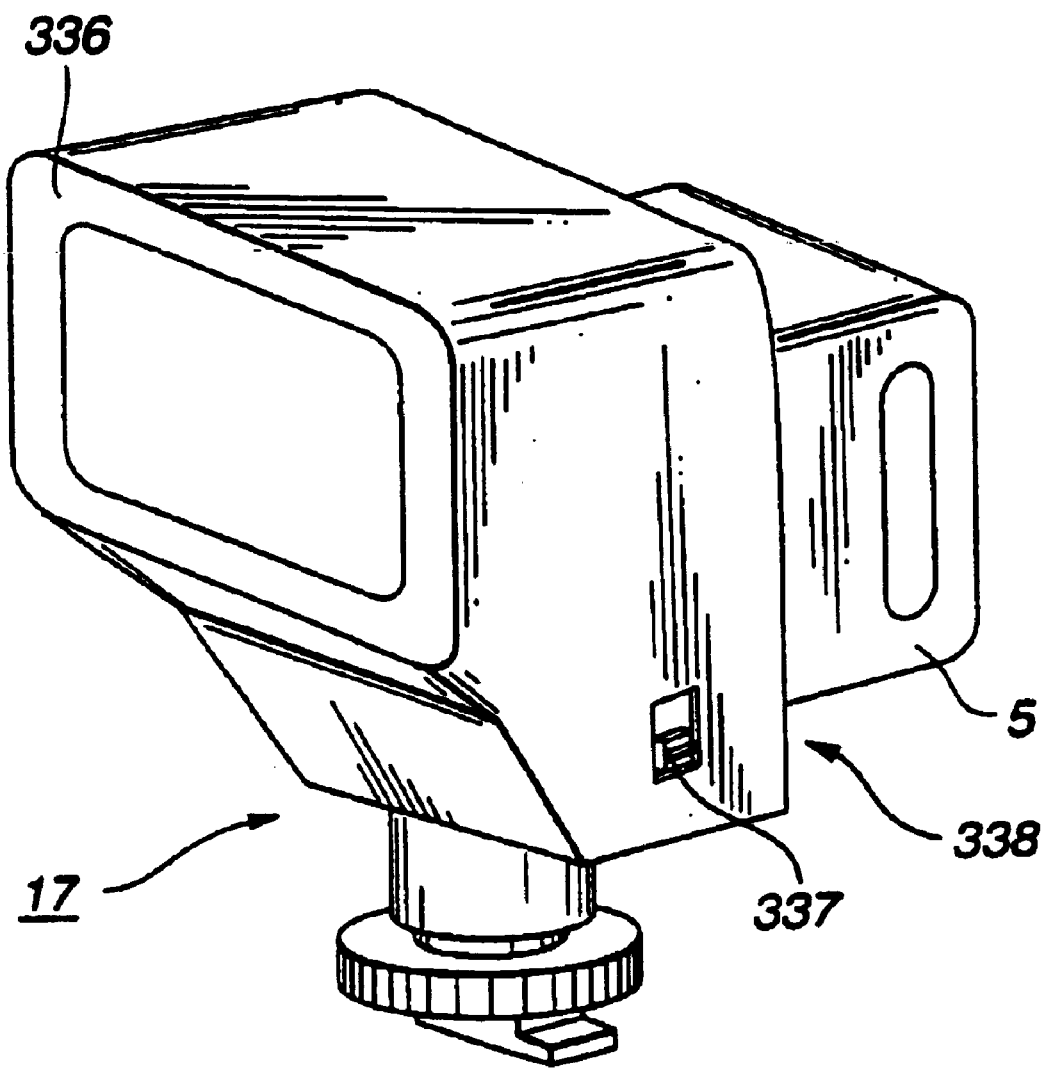
FIG. 29 is a perspective view showing a second illumination device.
Figure 30:
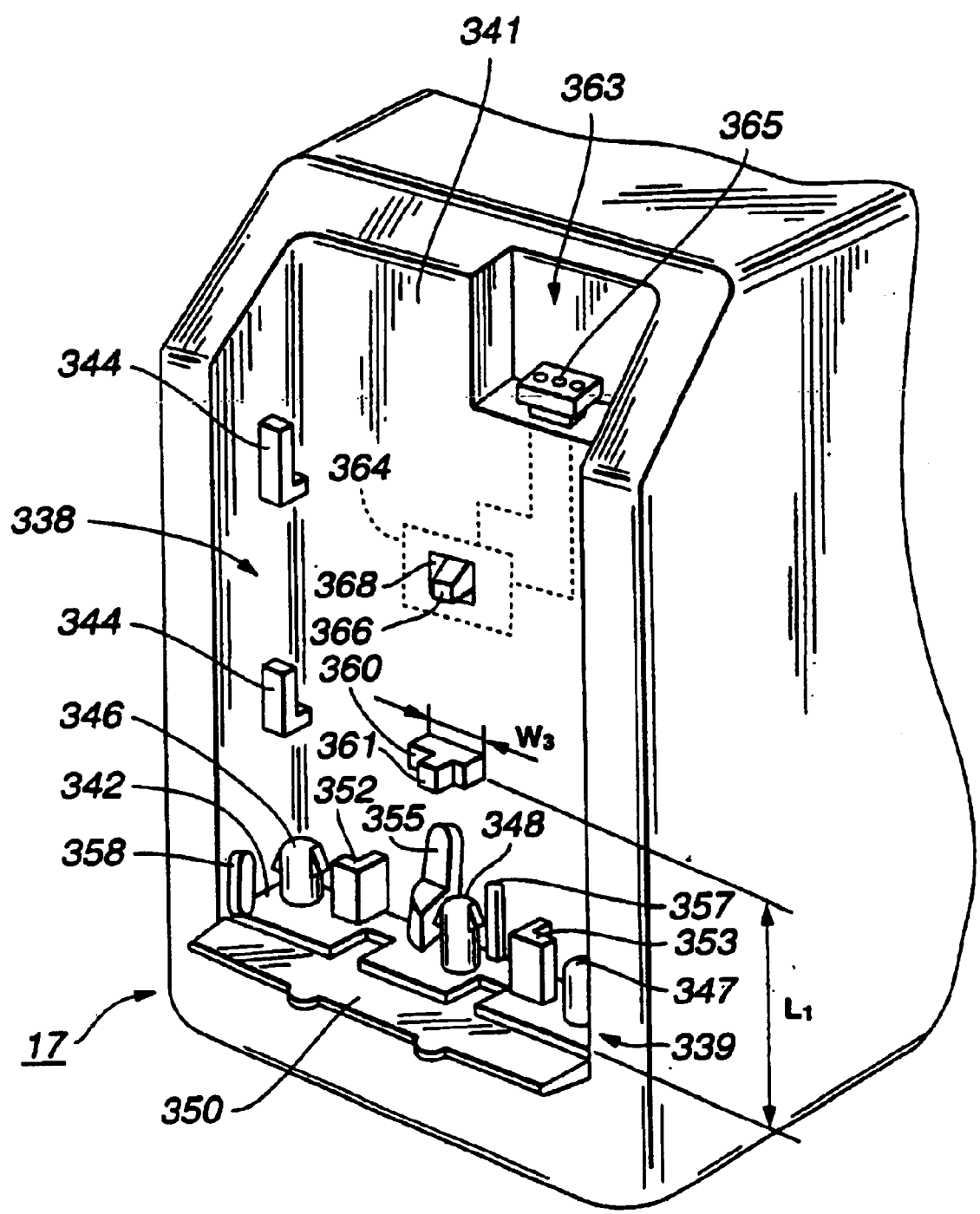
FIG. 30 is a perspective view showing a sixth battery loading device.

As shown in FIGS. 29 and 30, the second illumination device 17 includes an illumination unit 336 for illuminating an object, a changeover switch 337 for changing over the operating state of the illumination unit 336, a loading section 338 on which the first battery pack 5 may be removably loaded, and a terminal unit 339 to which the output terminals 21 to 23 of the first battery pack 5 may be connected.

On both lateral sides in the width-wise direction of the setting surface 341 and adjacent thereto, there are formed guide projections 344 engageable in the guide grooves 26 of the first battery pack 5.

The terminal unit 339 is arranged on the abutment surface 342 adapted to face the front surface 20 of the loaded first battery pack 5, and includes first to third connection terminals 346 to 348 to which the output terminals 21 to 23 of the first battery pack 5 may be connected. The terminal unit 339 is also provided with a cover member 350 for protecting the connection terminals 346 to 348. The cover member is mounted for rotation relative to the loading section 338, as shown in FIG. 30.

The loading section 338 of the second illumination device 17 is formed as one with a pair of control projections 352, 353 line-symmetrically with respect to substantially the centerline in the width-wise direction of the setting surface 341. The control projections 352, 353 are formed astride the abutment surface 342 and the setting surface 341 so as to be engageable in the control recesses 28, 29 of the first battery pack 5. These control projections 352, 353 are of a height level in the direction perpendicular to the setting surface 341 higher than the outer periphery of the connection terminals 346 to 348 to prevent possible destruction of the connection terminals 346 to 348.

The loading section 338 of the second illumination device 17 is formed as one with a first guide projection 355 for guiding the loading of the first battery pack 5 parallel to the longitudinal direction of the setting surface 341. The first guide projection 355 is provided astride the abutment surface 342 and the setting surface 341 and adjacent to the third connection terminal 348. This first guide projection 355 is formed with a step protruding in a direction perpendicular to the setting surface 341 and integrally connected to the abutment surface 342. This step has a height level in a direction perpendicular to the setting surface 341 slightly higher than the control projections 352, 353 to prevent possible destruction of the connection terminals 346 to 348.

The loading section 338 of the second illumination device 17 is formed as one with a second guide projection 357 extending parallel to the longitudinal direction of the setting surface 341. The second guide projection 357 is formed astride the setting surface 341 and the abutment surface 342 for guiding the loading of the first battery pack 5. On both width-wise lateral sides of the loading section 338 of the second illumination device 17 are formed protruding control pawls 358, 358 engageable in the control groove 37 of the first battery pack 5. The control pawls 358, 358 are parallel to the setting surface 341 and to the longitudinal direction of the setting surface. At a mid portion of the setting surface 341 of the loading section 338 of the second illumination device 17 is integrally formed a discriminating projection 360 engageable in the discriminating recess 30 of the first battery pack 5. The distal end of the discriminating projection 360 is formed with a discriminating lug 361.

The discriminating projection 360 has a width $W_3$ larger than the width $W_1$ of the discrimination projection 73 of the first battery loading device 6. The discriminating projection 360 is formed at a position spaced a distance $L_1$ smaller than the distance $L_2$ of the discriminating projection 325 of the first illumination device 15 in a direction perpendicular to the abutment surface 342.

The loading section 338 of the second illumination device 17 is provided with a lock mechanism 363 for holding the loaded first battery pack 5. The lock mechanism 363 includes a lock member 364 having a lock pawl 366 engageable in the first lock hole 30 of the first battery pack 5, and an operating piece 365 for actuating the lock member 364. The lock pawl 366 is movably passed through an opening 368 formed in the setting surface 341.

If the first or second battery pack 5 or 12 is loaded on the loading section 338 of the above-described second illumination device 17, the discriminating projection 360 will be inserted into the discriminating recesses 30, 190 to demonstrate that the first and second battery packs 5, 12 are appropriate for the loading section 338 to permit the battery pack 5 or 12 to be loaded in position.

If the second battery pack 7, verified to be inappropriate, is loaded on the loading section 338 of the second illumination device 17, the discriminating lug 361 of the discriminating projection 360 will be pressed against the discriminating projection 116 of the discriminating recess 113 to prevent the insertion. Thus, the second battery pack 7 is verified to be inappropriate and non-loadable. On the other hand, if the third battery pack 9, verified to be inappropriate, is loaded on the second illumination device 17, the discriminating lug 361 of the discriminating projection 360 will be pressed against the discriminating projection 139 of the discriminating recess 137 to prevent the insertion. Thus, the third battery pack 9 is verified to be inappropriate and non-loadable. Also, if the battery plate 11, verified to be inappropriate, is loaded on the loading section 338 of the second illumination device 17, the step on the first guide projection 355 will be pressed against the planar surface of the first guide groove 167 to prevent the insertion. Moreover, since the width $W_2$ of the discriminating recess 163 of the battery plate 11 is smaller than the width $W_3$ of the discriminating projection 360, the discriminating projection 360 cannot be inserted into the discriminating recess 163. Thus, the battery plate 11 is verified to be inappropriate and non-loadable. Therefore, the high capacity type first and fourth battery packs 5, 12 can be loaded on the loading section 338 of the second illumination device 17.

With the battery loading mechanism according to the present invention, the discriminating recesses 30, 113, 137, 190 of the battery packs 5, 7, 9, 11, discriminating grooves 32, 115, 138, 191 in the discriminating recesses 30, 113, 137, 190, discriminating projections 116, 139, discriminating recess 140, discriminating projections 73, 226, 291, 325, 360 and the discriminating lugs 74, 326 and 361 of these discriminating projections 73, 226, 291, 325, 360 are used for discrimination, so that it is possible to set various shapes conforming to plural specifications. Since it suffices in this battery loading mechanism to suitably modify only the shape of the discriminating recesses and the discriminating projections, it is unnecessary to manufacture new metal molds for different battery packs having different specifications, rendering it possible to reduce the manufacturing cost of metal molds.

It should be noted that, although the battery pack according to the present invention includes a battery cell having a chargeable secondary battery, this is merely illustrative since the battery pack can be configured to exchangeably hold primary dry batteries. Moreover, although the battery loading device according to the present invention is configured for being loaded on a video camera or an illumination device, it may also be mounted on an electronic equipment such as a charging device used for charging the battery pack.

What is claimed is:

1. A power supply device, comprising:

a connection terminal connected to power supply means;

a casing for housing said power supply means, said casing having a first surface and a second surface arranged transverse to one another so as to define an edge at an intersection of said first and second surfaces, said second surface extending in a longitudinal direction;

an output terminal arranged on said first surface of said casing for outputting power from said power supply means to said connection terminal;

a plurality of recesses arranged substantially on a centerline of said second surface, said second surface centerline extending in said longitudinal direction; and a plurality of engagement recesses formed at said edge and having openings in said first and second surfaces for engaging with a battery loading device;

said opening in said first surface of at least one of said engagement recesses including a portion perpendicular to said second surface and a portion parallel to said second surface.

2. The power supply device according to claim 1, wherein said openings in said first surface of two of said engagement recesses are on opposite sides of a centerline of said first surface, said first surface centerline extending in a direction transverse to said second surface.

3. The power supply device according to claim 1, wherein said openings in said first surface of two of said engagement recesses are substantially L-shaped.

4. The power supply device according to claim 1, wherein said connection terminal has a first portion proximate to an engagement surface of the battery loading device and a second portion remote from the engagement surface of the battery loading device, said second portion being spaced from the engagement surface of the battery loading device by a predetermined height, and said opening in said first surface of at least one of said engagement recesses has a height in a direction perpendicular to said second surface at least as large as said predetermined height.

5. The power supply device according to claim 1, wherein said casing includes third and fourth surfaces arranged transversely to both said first surface and said second surfaces, said third and fourth surfaces including grooves engageable by the battery loading device, each of said grooves having an end open to said first surface.

* * * * *

UNITED STATES PATENT AND TRADEMARK OFFICE
CERTIFICATE OF CORRECTION

PATENT NO. : 6,749,960 B2
DATED : June 15, 2004
INVENTOR(S) : Toshio Takeshita and Masaki Hanzawa It is certified that error appears in the above-identified patent and that said Letters Patent is hereby corrected as shown below:

Column 24,
Line 54, "surfaces" (first occurrence) should read -- surface --.

Signed and Sealed this

Eighth Day of February, 2005

JON W. DUDAS
*Director of the United States Patent and Trademark Office*